(12) United States Patent
Chan et al.

(10) Patent No.: US 12,260,120 B2
(45) Date of Patent: Mar. 25, 2025

(54) GUEST OPERATING SYSTEM BUFFER AND LOG ACCESSES BY AN INPUT-OUTPUT MEMORY MANAGEMENT UNIT

(71) Applicant: Advanced Micro Devices, Inc., Santa Clara, CA (US)

(72) Inventors: Maggie Chan, Toronto (CA); Philip Ng, Toronto (CA); Paul Blinzer, Bellevue, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 233 days.

(21) Appl. No.: 16/436,813

(22) Filed: Jun. 10, 2019

(65) Prior Publication Data
US 2020/0387326 A1    Dec. 10, 2020

(51) Int. Cl.
*G06F 3/06*       (2006.01)
*G06F 9/455*      (2018.01)
*G06F 13/16*      (2006.01)

(52) U.S. Cl.
CPC ............ *G06F 3/0659* (2013.01); *G06F 3/061* (2013.01); *G06F 3/0644* (2013.01); *G06F 3/0656* (2013.01); *G06F 3/0673* (2013.01); *G06F 9/45558* (2013.01); *G06F 13/1668* (2013.01); *G06F 2009/45579* (2013.01)

(58) Field of Classification Search
CPC ...... G06F 3/0659; G06F 3/061; G06F 3/0644; G06F 3/0656; G06F 3/0673; G06F 9/45558; G06F 13/1668; G06F 2009/45579
See application file for complete search history.

(56) References Cited

U.S. PATENT DOCUMENTS

| | | | |
|---|---|---|---|
| 2007/0168641 A1* | 7/2007 | Hummel | G06F 9/45558 711/206 |
| 2013/0145051 A1 | 6/2013 | Kegel et al. | |
| 2014/0068137 A1* | 3/2014 | Kegel | G06F 12/109 711/6 |
| 2015/0355883 A1* | 12/2015 | Kegel | G06F 5/085 711/165 |

OTHER PUBLICATIONS

Introduction of AMD Advanced Virtual Interrupt Controller, XenSummit 2012 by Wei Huang, Aug. 2012 (Year: 2012).*

(Continued)

*Primary Examiner* — Tim T Vo
*Assistant Examiner* — Janice M. Girouard
(74) *Attorney, Agent, or Firm* — FIG. 1 Patents

(57) ABSTRACT

An electronic device includes a processor that executes a guest operating system; a memory having a guest portion that is reserved for storing data and information to be accessed by the guest operating system; and an input-output memory management unit (IOMMU). The IOMMU writes, in the guest portion, information into guest buffers and/or logs used for communicating information from the IOMMU to the guest operating system. The IOMMU also reads, from the guest portion, information in guest buffers and/or logs used for communicating information from the guest operating system to the IOMMU.

22 Claims, 10 Drawing Sheets

(56) References Cited

OTHER PUBLICATIONS

A Meriam Webster definition of "copy" that defines a copy as a duplicate, for example of copy (duplicate) of a computer file attached as a snapshot of the merriam-webster page taken was taken from https://web.archive.org/web/20170708222225/https://www.merriam-webster.com/dictionary/copy. (Year: 2017).*
Random House Webster's College Dictionary, 373, 374, 691, 695-696 (2nd Random House ed. 1999).*
Microsoft Computer Dictionary, 126, 367 (5th ed. 2002).*
Advanced Micro Devices, Inc., AMD I/O Virtualization Technology (IOMMU) Specification, rev. 3.00, Dec. 2016.
"Notice of Allowance", CN Application No. 2020080043003.7, Oct. 28, 2024, 5 pages.
"Foreign Office Action", EP Application No. 20821688.7, 6 pages.
Advanced Micro Devices, Inc., "AMD 1/0 Virtualization Technology (IOMMU) Specification", 48882-Rev3.00, Dec. 2016, 269 pages.
Intel, "PCI-SIG SR-IOV Primer", An Introduction to SR-IOV Technology, 321211-002, Jan. 2011, 28 pages.

* cited by examiner

GUEST OPERATING SYSTEM BUFFER AND LOG ACCESSES BY AN INPUT-OUTPUT MEMORY MANAGEMENT UNIT

BACKGROUND

Related Art

Some electronic devices (e.g., server or desktop computers, etc.) support "virtualization" of electronic device hardware such as input-output (I/O) devices, etc. Virtualization involves an intermediary entity on or in the electronic device providing, to instances of software executing on the electronic device (e.g., application programs, etc.), the illusion that the instances of software are able to access electronic device hardware directly, when, in reality, the intermediary entity intercepts/redirects or otherwise assists with accesses made by the instances of software. For example, one common intermediary entity is a "virtual machine." Virtual machines are software entities that—often with platform hardware support—abstract electronic device hardware and emulate or present a known interface to electronic device hardware, thereby enabling instances of software to execute on various types and arrangements of underlying electronic device hardware—possibly including electronic device hardware with which the instances of software would otherwise not be compatible. In some electronic devices, virtual machines provide support for executing one or more instances of operating systems, called "guest" operating systems, each with their view of a particular machine's (virtualized) resources like memory, a central processing unit (CPU), etc. Guest operating systems in turn provide environments for executing other instances of software such as productivity applications, databases, etc.

In some electronic devices, virtual machines are managed and controlled by a software entity known as a hypervisor. Hypervisors may start or initialize virtual machines; control, monitor, and assist with accesses of electronic device hardware by virtual machines; terminate or close virtual machines; provide specific virtualized resources at expected locations or with particular hardware programming models; arbitrate accesses to physical resources required by multiple virtual machines; direct external interface input and output (e.g. from users or from networks to the appropriate virtual machine); etc. FIG. 1 presents a block diagram illustrating virtual machines and a hypervisor. As can be seen in FIG. 1, there are three virtual machines (VM) 100, under each of which executes a guest operating system (GUEST OS) 102 and one or more programs (PRGRMS) 104, such as databases, software applications, etc. Virtual machines 100 communicate with hypervisor 106, which interfaces between a host operating system (HOST OS) 108 and virtual machines 100. Host operating system 108 provides an interface between electronic device hardware 110 and hypervisor 106. In addition, hypervisor 106 interfaces between virtual machines 100 and input-output management unit (IOMMU) 112, with IOMMU 112 serving as a memory management unit and controller for IO device hardware 114.

Among the operations performed by hypervisors is the handling of communications between electronic device hardware and guest operating systems (or, more broadly, virtual machines). For example, a hypervisor may translate, redirect, or otherwise assist with communications between guest operating systems and an input-output management unit (IOMMU), such as by providing memory addresses for I/O device direct memory accesses to memory being used by a virtual machine. The communications handled by the hypervisor include communications such as peripheral page request (PPR) log and event log writes by the IOMMU and command buffer writes by the guest operating systems. PPR log, event log, and command buffer writes are described in detail in the AMD I/O Virtualization Technology (IOMMU) Specification, rev. 3.00, December 2016, which is incorporated by reference herein in its entirety.

FIG. 2 presents a block diagram illustrating typical communications between a guest operating system and an IOMMU that are handled by the hypervisor. In FIG. 2, a number of elements are shown dotted/stippled; these elements are logs, buffers, etc. that are stored in a memory (e.g., a main memory for the electronic device) and thus accessed via typical memory access techniques. The elements in FIG. 2, along with guest operating system 102, hypervisor 106, and IOMMU 112, include guest peripheral page request (PPR) log 200, guest command buffer (CMD BUF) 202, and guest event log 204, which are structures (e.g., lists, tables, etc.) in memory that are used for storing communications from and destined for guest operating system 102. In addition, the elements include guest pointers (PTRS)/status registers (REGS) 206, which are a set of locations in memory for storing pointers to guest operating system structures and status information associated with the guest operating system. The elements further include IOMMU peripheral page request (PPR) log 208, IOMMU command buffer 210, and IOMMU event log 212, which are structures (e.g., lists, tables, etc.) in memory that are used for storing communications from and destined for IOMMU 112. The elements also include IOMMU memory mapped input-output (MMIO) pointers/status registers (REGS) 214 in IOMMU 112, which are a set of registers in IOMMU 112 for storing pointers to various IOMMU 112 structures and status information associated with the IOMMU 112.

In operation, and using a command as an example, guest operating system 102 writes a command destined for IOMMU 112 to guest command buffer 202 (i.e., to a next available location in the buffer in memory where commands from guest operating system 102 are stored). Hypervisor 106, as shown via a dotted line in FIG. 2, detects the guest operating system's write to guest command buffer 202, acquires and processes the command (e.g., replaces a guest domainID and/or guest deviceID in the command with a corresponding host domainID and/or deviceID, etc.), and stores the processed command in IOMMU command buffer 210. Hypervisor 106 also updates a tail pointer in IOMMU MMIO pointers/status registers 214 for IOMMU command buffer 210 to indicate the newly written command (e.g., increments the tail pointer to a next location in IOMMU command buffer 210). IOMMU 112 then uses a command buffer head pointer, etc. to retrieve the command from IOMMU command buffer 210 and executes the command, which causes IOMMU 112 to perform a corresponding action. Hypervisor 106 performs similar operations for IOMMU 112 writes to IOMMU peripheral page request log 208 and to IOMMU event log 212 (e.g., replacing host deviceIDs with guest deviceIDs, etc.). Because the memory reads and writes, the updates of the pointer, and the other operations performed by hypervisor 106 are longer latency, using hypervisor 106 to intervene between guest operating system 102 and IOMMU 112 leads to delay in processing communications, as well as causing the processor to be busy and adding traffic on a memory bus in the electronic device.

BRIEF DESCRIPTION OF THE FIGURES

Throughout the figures and the description, like reference numerals refer to the same figure elements.

DETAILED DESCRIPTION

Figure 1:
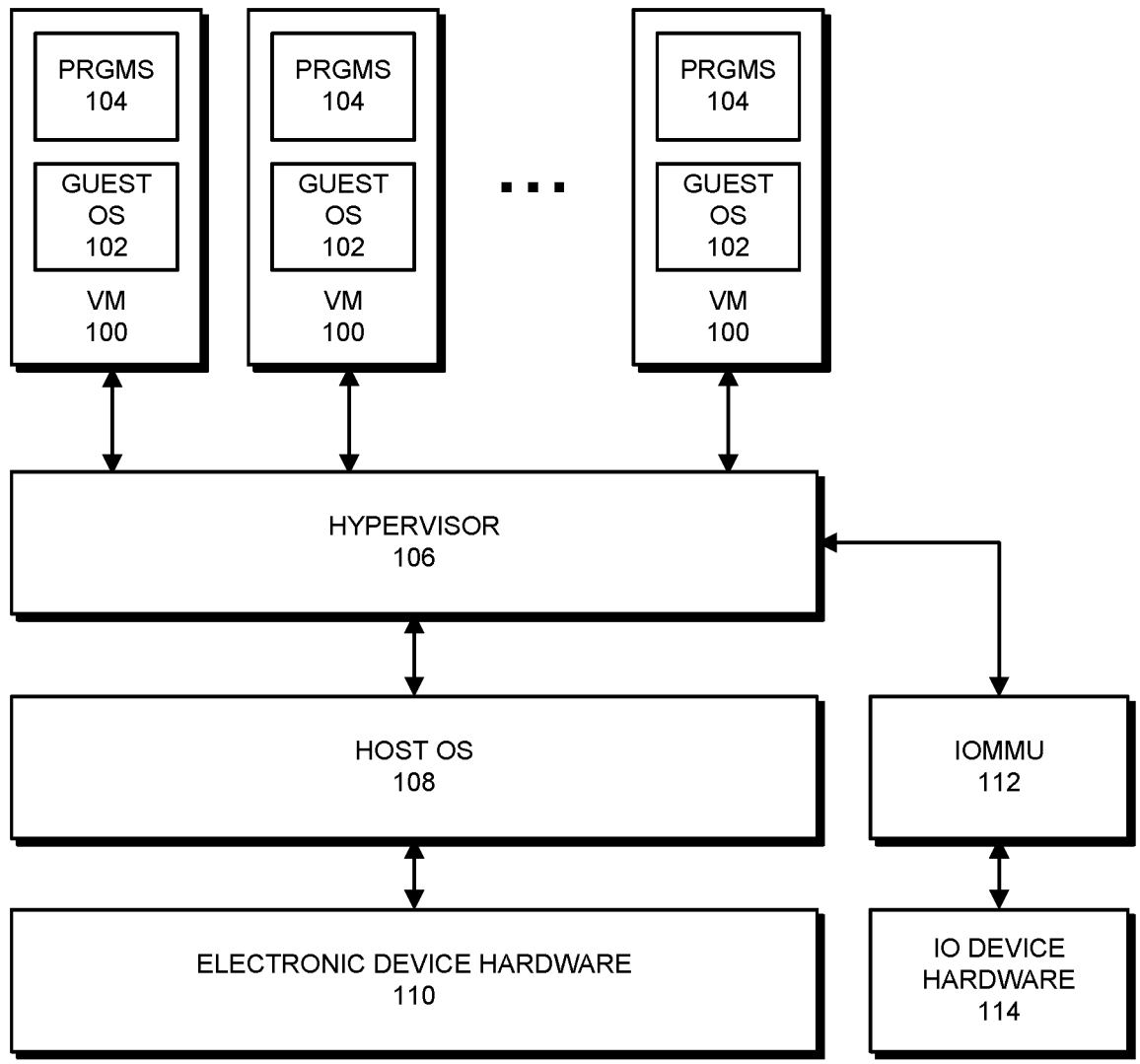
FIG. 1 presents a block diagram illustrating virtual machines and a hypervisor.

The following description is presented to enable any person skilled in the art to make and use the described embodiments and is provided in the context of a particular application and its requirements. Various modifications to the described embodiments will be readily apparent to those skilled in the art, and the general principles defined herein may be applied to other embodiments and applications. Thus, the described embodiments are not limited to the embodiments shown but are to be accorded the widest scope consistent with the principles and features disclosed herein.

Terminology

In the following description, various terms are used for describing embodiments. The following is a simplified and general description of one of these terms. Note that this term may have significant additional aspects that are not recited herein for clarity and brevity and thus the description is not intended to limit the term.

Functional block: functional block refers to a group, collection, and/or set of one or more interrelated circuit elements such as integrated circuit elements, discrete circuit elements, etc. The circuit elements are "interrelated" in that circuit elements share at least one property. For instance, the interrelated circuit elements may be included in, fabricated on, or otherwise coupled to a particular integrated circuit chip or portion thereof, may be involved in the performance of given functions (computational or processing functions, memory functions, etc.), may be controlled by a common control element and/or a common clock, etc. A functional block can include any number of circuit elements, from a single circuit element (e.g., a single integrated circuit logic gate) to millions or billions of circuit elements (e.g., an integrated circuit memory).

Virtualization, Virtual Machines, and Hypervisors

The described embodiments support "virtualization" of electronic device hardware such as memories, input-output (IO) devices, etc. Virtualization generally involves an intermediary entity on or in the electronic device providing, to instances of software executing on the electronic device, the illusion that the instances of software are able to access electronic device hardware directly, when, in reality, the intermediary entity intercepts/redirects, translates, or otherwise assists with accesses made by the instances of software. For example, an instance of software may be presented, by an intermediary entity, with a set of electronic device registers, memory locations, electronic device settings, and other functional blocks that appear to the instance of software to be actual device registers, memory locations, etc. of an electronic device, but instead are merely copies that are presented by the intermediary entity. In this case, the intermediary entity receives, intercepts, or otherwise acquires accesses of the copies of electronic device hardware and makes corresponding interactions with actual electronic device hardware on behalf of the instance of software. The virtualization of electronic device hardware has a number of benefits, such as enabling different electronic devices to use different arrangements of electronic device hardware, different addresses, locations, or identifiers for electronic device hardware, etc., while instances of software are presented, via the intermediary entities, with the same interfaces to electronic device hardware. In addition, intermediary entities may determine whether to allow or block accesses of electronic device hardware by given instances of software, and thus virtualization of electronic device hardware enables protection of electronic device hardware (or portions thereof) and/or instances of software executing on the electronic devices. By controlling access as described, the intermediary entities may share electronic device hardware between a number of instances of software and/or provide exclusive access to portions of electronic device hardware to individual instances of software.

In the described embodiments, the intermediary entities include "virtual machines." Virtual machines are software entities that abstract electronic device hardware and present, to instances of software, a known interface to actual or emulated electronic device hardware. Abstracting the hardware enables the instances of software to execute on various types and arrangements of underlying electronic device hardware—possibly including electronic device hardware with which the instances of software would otherwise not be compatible. In the described embodiments, virtual machines provide support for executing one or more instances of operating systems, called "guest" operating systems. Guest operating systems in turn provide environments for executing other software programs such as applications, databases, etc.

Figure 3:
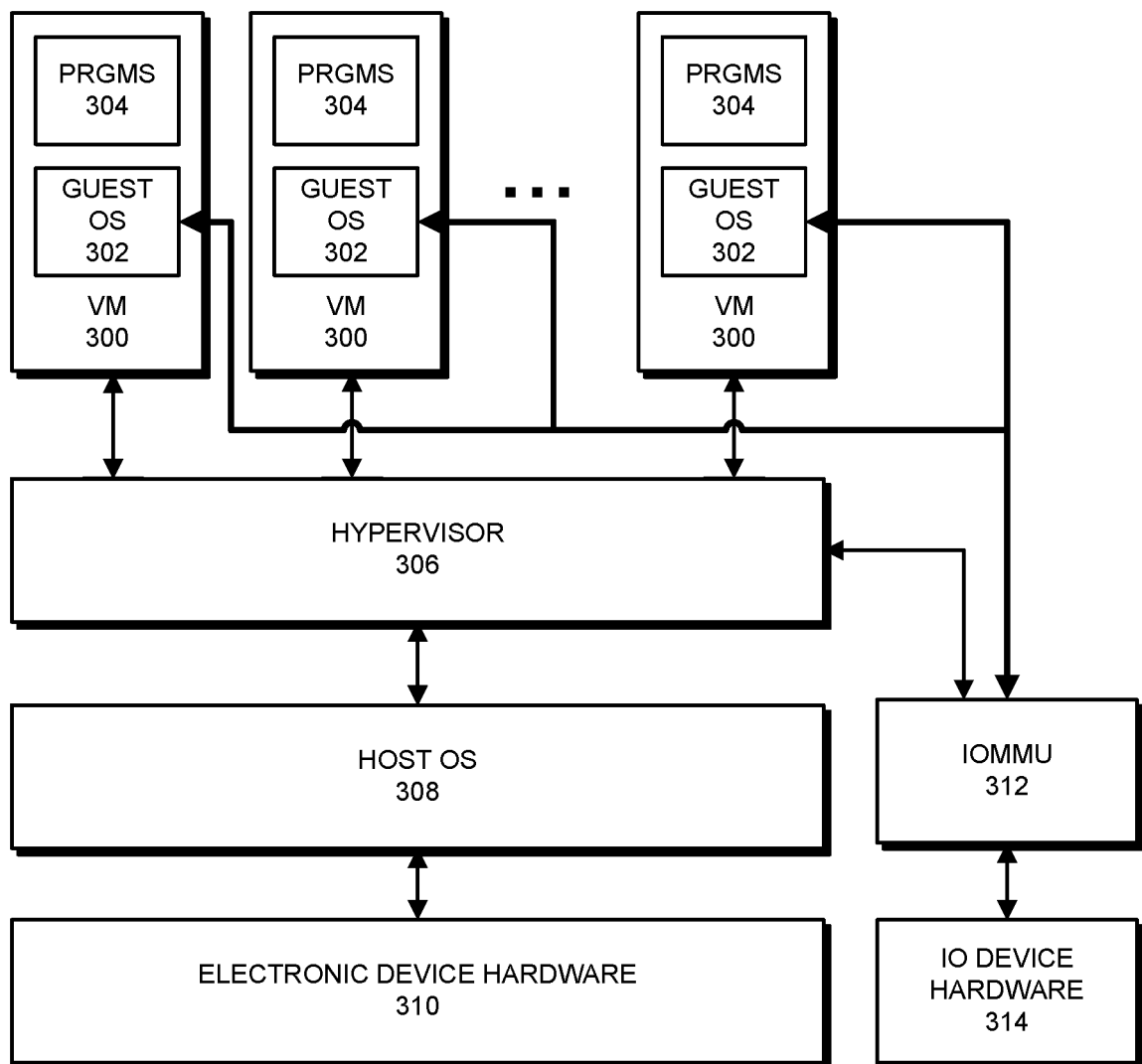
FIG. 3 presents a block diagram illustrating virtual machines and a hypervisor in accordance with some embodiments.

In the described embodiments, virtual machines are managed and controlled by a software entity known as a hypervisor. Hypervisors may start or initialize virtual machines; control, monitor, and assist with accesses of electronic device hardware by virtual machines; terminate or close virtual machines; etc. FIG. 3 presents a block diagram illustrating virtual machines and a hypervisor in accordance with some embodiments. As can be seen in FIG. 3, there are three virtual machines (VM) 300, under each of which executes a guest operating system (GUEST OS) 302 and one or more programs (PRGRMS) 304, such as databases, software applications, etc. Virtual machines 300 communicate with hypervisor 306, which interfaces between a host operating system (HOST OS) 308 and virtual machines 300. Host operating system 308 provides an interface between electronic device hardware 310 and hypervisor 306. Differently than what is shown in FIG. 1 for existing electronic devices, in FIG. 3, IOMMU 312 and IO device hardware 314, without hypervisor 306 intervening (as shown by the heavier line between IOMMU 312 and guest operating systems 302). Unlike in existing electronic devices, therefore, in the described embodiments, hypervisor 306 is not responsible for performing at least some of the operations for handling communications between guest operating systems 302 and IOMMU 312, as described herein. Note, however, that certain communications occur between IOMMU 312 and hypervisor 306, as shown by the line between hypervisor 306 and IOMMU 312. In addition, note that, in some embodiments, host operating system 308 is not present and hypervisor 306 communicates more directly with electronic device hardware 310.

Overview

In the described embodiments, an electronic device includes a processor, a memory (e.g., a main memory), a number of input-output (IO) devices (e.g., a network interface device, a disk controller, etc.), and an input-output memory management unit (IOMMU) that interfaces between the processor and the IO devices. The processor executes a hypervisor, one or more virtual machines, and, in the virtual machines, guest operating systems. Each of the guest operating systems is allocated a guest portion of the memory (a contiguous or non-contiguous region or block of memory) that is reserved for storing data and information to be accessed by that guest operating system. In the described embodiments, the IOMMU performs operations for handling communications between guest operating systems and the IOMMU.

As part of handling the communications between guest operating systems and the IOMMU, instead of using a single IOMMU copy of certain buffers and logs as in existing systems, the IOMMU directly accesses buffers and logs for each guest operating system in a corresponding guest portion of the memory. In other words, the IOMMU accesses, instead of the copy of the buffers and logs maintained by the IOMMU (and the hypervisor) in existing systems, a separate and individual copy of the buffers and logs that is used by each of the guest operating systems. For example, in some embodiments, each guest operating system maintains, in a corresponding guest portion of the memory, buffers and logs including a command buffer, an event log, and/or a peripheral page request (PPR) log—and the IOMMU directly reads information from and/or writes information to memory locations (e.g., entries) in the buffers and logs for each guest operating system in that guest operating system's portion of the memory.

In existing systems in which the IOMMU uses the single copy of the buffers and logs, the IOMMU maintains a set of IOMMU memory-mapped input-output (MMIO) registers that are used for storing information about the buffers and logs. For example, the IOMMU MMIO registers include information such as set of pointers (e.g., head and/or tail pointers for each log or buffer, etc.) and control values (e.g., a size indicator and/or configuration values for each log or buffer, etc.) for the buffers and logs. Because, in the described embodiments, the IOMMU separately accesses the buffers and logs in the different guest portions of the memory (i.e., at different memory addresses and possibly with different control values), a single set of IOMMU MMIO registers is inadequate. In the described embodiments, therefore, the IOMMU is provided with a separate copy of the set of IOMMU MMIO registers for each guest operating system that is used for accessing the buffers and logs in the corresponding guest portion of the memory. In other words, in some embodiments, if N guest operating systems are supported by the system, the IOMMU is provided with N copies of the IOMMU MMIO registers (i.e., the set of pointers and control values for the buffers and logs), one for each guest operating system.

Due to the number registers required for keeping track of the buffers and logs for all possible guest operating systems (which can be quite large), the separate copies of the IOMMU MMIO registers are not physically present in the IOMMU (i.e., the IOMMU does not include hardware circuits for the copies of the IOMMU MMIO registers). Instead, the separate copies of the set of IOMMU MMIO registers for the guest operating systems are stored in an IOMMU backing store, which is a portion of the main memory that is reserved for storing data and information for the IOMMU. In the described embodiments, the IOMMU "virtualizes" the IOMMU MMIO registers, or presents guest operating systems (and other entities, e.g., the hypervisor, etc.) with the appearance that the guest operating systems are able to access the IOMMU MMIO registers via specified IOMMU MMIO addresses. There are, however, no registers at the IOMMU MMIO addresses. Instead, the IOMMU intercepts accesses by the guest operating systems to the IOMMU MMIO registers at the IOMMU MMIO addresses and redirects accesses of the IOMMU MMIO registers to the corresponding locations in the IOMMU backing store. For example, in some embodiments, the IOMMU MMIO addresses include addresses from a specified range of addresses provided by the IOMMU in an IOMMU interface/aperture that are used for mapping communications to copies of IOMMU registers in the IOMMU backing store.

In operation, the IOMMU performs a number of operations for accessing the guest buffers or logs (or, more generally, corresponding memory locations) in guest portions of memory. For instance, the IOMMU may read, from a guest buffer or log, information written to the guest buffer or log by a guest operating system (or another entity, including the IOMMU itself). In some embodiments, the operations for reading, by the IOMMU, the guest buffer or log start when the guest operating system writes information to the guest buffer or log in a respective guest portion of the memory. For example, the guest operating system may write a command to a command buffer in the guest portion of the memory, the command, when processed by the IOMMU, causing the IOMMU to perform a corresponding action. The guest operating system next transmits a memory write to update a command buffer tail pointer in an IOMMU MMIO register (and/or other command buffer IOMMU MMIO registers) that is received, intercepted, or otherwise detected by the IOMMU. The IOMMU then performs a corresponding write of a copy of the IOMMU MMIO register for the guest operating system in which the command buffer tail pointer is stored in the IOMMU backing store. Continuing the example, the IOMMU may write, to the copy of the command buffer tail pointer register for the guest operating system in the IOMMU backing store, updated data such as a new address or offset for the command buffer tail pointer. In addition, the IOMMU monitors for such writes from guest operating systems, e.g., monitors for writes to the IOMMU MMIO registers, etc. The IOMMU then directly or indirectly uses the information from the command buffer head pointer to read the command from the guest command buffer in the guest portion of the memory. The IOMMU then processes the command, thereby causing the IOMMU to perform the corresponding action. After processing the command, the IOMMU updates the command buffer head pointer in the copy of the IOMMU MMIO register for the guest operating system in the IOMMU backing store—and may update other command buffer information for the guest operating system in the IOMMU backing store. For example, the IOMMU may update the command buffer head pointer in the copy of the IOMMU MMIO register to indicate that the command has been processed and is thus no longer present in the command buffer in the guest portion of the memory (such as by advancing the command buffer head pointer to indicate a next entry in the command buffer).

In addition to reading information from a guest buffer or log, the IOMMU may write, to a guest buffer or log, information to be read by a guest operating system (or another entity, including the IOMMU itself). For example, the IOMMU may write information about an event to an event log in a guest portion of memory for a guest operating system. In some embodiments, when writing information to a guest buffer or log for a given guest operating system, the IOMMU first determines a location of the guest buffer or log (or an entry therein) in a guest portion of the memory for the given guest operating system. For this operation, the IOMMU determines a system physical address of a copy of an IOMMU MMIO register for the guest operating system that includes location information for the guest buffer or log in an IOMMU backing store. Continuing the example, the IOMMU determines the system physical address of a copy of an IOMMU MMIO register for the guest operating system in the IOMMU backing store in which an event log tail pointer is stored. The IOMMU then acquires, from the copy of the IOMMU MMIO register at the system physical address, the location information (e.g., a system physical address of an entry, an entry counter, etc.) for the guest buffer or log for the guest operating system. The IOMMU next uses the location information to write information to the given guest buffer or log in the memory. For example, the IOMMU may, using the location information, write information about an event to the event log in the guest operating system's guest portion of the memory. The IOMMU next updates the copy of the associated IOMMU MMIO register in the IOMMU backing store to indicate that the write occurred (e.g., advances the command buffer tail pointer to a next entry in the command buffer in the guest portion of the memory). The IOMMU also sends, to the guest operating system, an internal interrupt indicating that the IOMMU wrote the information to the guest buffer or log. The guest operating system then performs operations for reading, based on the interrupt, the information from the guest buffer or log in the guest portion of the memory (these operations are described in detail below).

By directly accessing—i.e., performing memory reads of and writes to—the buffers and logs in guest portions of the memory for guest operating systems, the IOMMU is able to avoid, as with existing systems, relying on the hypervisor for intervening in/handling accesses of the guest buffers and logs. Removing these operations from the hypervisor (implemented in software) to the IOMMU (implemented in hardware) speeds up the operations, requires less memory system bandwidth, and puts less load on computational functional blocks in the processor, which improves the overall performance of the electronic device. The improved performance of the electronic device leads to higher user satisfaction.

Electronic Device

Figure 4:
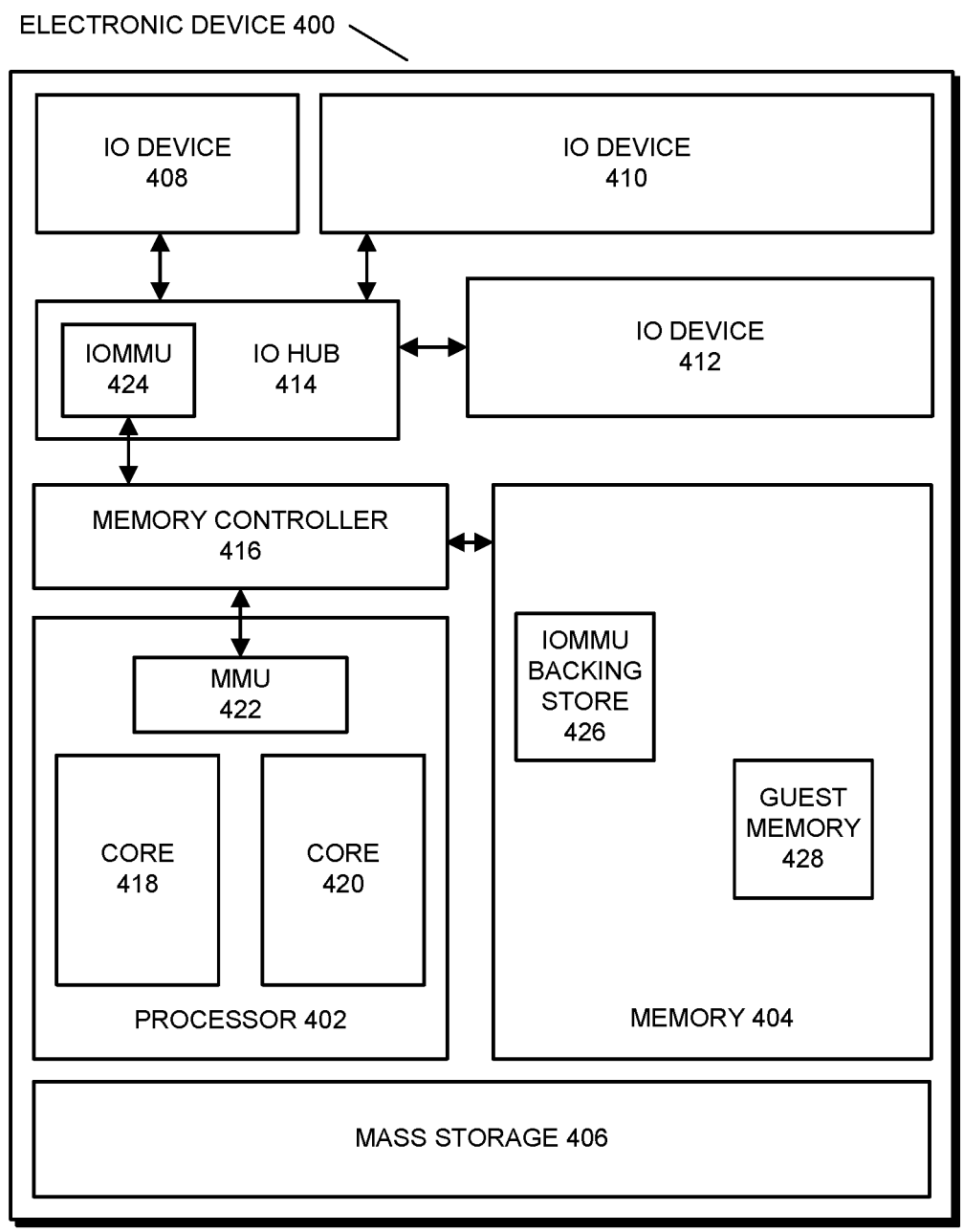
FIG. 4 presents a block diagram illustrating an electronic device in accordance with some embodiments.

FIG. 4 presents a block diagram illustrating electronic device 400 in accordance with some embodiments. As can be seen in FIG. 4, electronic device 400 includes processor 402, memory 404, mass storage 406, input-output (IO) devices 408-412, input-output (IO) hub 414, and memory controller 416.

Processor 402 is a functional block that performs computational operations in electronic device 400. Processor 402 includes two cores 418-420, each of which includes one or more computational mechanisms such as central processing unit (CPU) cores, graphics processing unit (GPU) cores, embedded processors, application specific integrated circuits (ASICs), and/or other computational mechanisms. Processor 402 also includes memory management unit (MMU) 422, which is a functional block that performs operations associated with address translations (e.g., page table walks, translation lookaside buffer lookups, etc.), memory access protections, etc. for memory accesses by cores 418-420.

Memory 404 is a functional block that performs operations of a memory in electronic device 400 (e.g., a "main" memory). Memory 404 includes memory circuits such as one or more of dynamic random access memory (DRAM), double data rate synchronous DRAM (DDR SDRAM), and/or other types of memory circuits for storing data and instructions for use by other functional blocks in electronic device 400, as well as control circuits for handling accesses (e.g., reads, writes, checks, deletes, invalidates, etc.) of the data and instructions that are stored in the memory circuits.

Mass storage 406 is a functional block and/or device that performs operations of a high-capacity non-volatile storage element for storing data and instructions for use by other functional blocks in electronic device 400. Mass storage 406 can be or include a high-capacity semiconductor memory (e.g., flash memory, etc.), a disk drive (hard drive, etc.), an optical drive, etc. Copies of the data and instructions stored in mass storage 406 are acquired and stored in memory 404 for use by other functional blocks in electronic device 400. For example, in some embodiments, data and/or instructions are retrieved from mass storage 406 in blocks or "pages" of a given size (e.g., 4 kB, 2 MB, etc.) and the pages are stored in memory 404 for accesses by the other functional blocks. In addition, pages may be newly created at an available location in memory 404 (e.g., for storing computational results, etc.).

IO devices 408-412 are functional blocks and/or devices that perform corresponding IO operations. The particular nature of the IO operations performed by each of IO devices 408-412 depend on the nature of the IO device. For example, IO devices 408-412 can include human interface devices, network interface devices, audio/visual processing or providing devices, GPUs, sensor devices, disk controllers, peripheral component interface (PCI) devices, universal serial bus (USB) devices, etc., and each IO device performs associated operations, such as receiving input from a human (e.g., keyboard, mouse, etc.), receiving or sending data on a network, etc. IO devices 408-412 provide data and/or instructions to, or consume data and/or instructions from, other functional blocks in electronic device 400. For example, in some embodiments, IO devices 408-412 access (i.e., read, write, invalidate, etc.) data in pages of memory in guest memory 428 (i.e., a portion of the memory reserved for a given guest operating system).

IO hub 414 is a functional block that performs operations of an input-output hub that interfaces between IO devices 408-412 and other functional blocks in electronic device 400 (e.g., processor 402, memory 404, etc.). The operations performed by IO hub 414 include operations for ensuring that communications destined for IO devices 408-412 reach the intended IO device, that communications from IO devices 408-412 properly reach other functional blocks, that the other functional blocks are kept secure from impermissible accesses by IO devices 408-412 and vice versa, etc. In some embodiments, IO hub 414 interfaces, and thus converts or translates associated communications, between buses that use different communication standards, such as between a peripheral component interface express (PCIe) bus and a HyperTransport link®, etc.

IO hub 414 includes IOMMU 424, which is a functional block that performs operations for enabling IO devices 408-412 to access data and/or instructions in memory 404, communicates with processor 402 (and guest operating systems executed thereby), etc. In these embodiments, when data and instructions are to be accessed by an IO device (e.g., IO device 408) in memory 404, the IO device sends a memory access request (e.g., a direct memory access request or DMA) to IOMMU 424. IOMMU 424 then sends a corresponding request to memory 404 for satisfaction of the memory access request. For example, in some embodiments, if data is to be retrieved based on the memory access request, IOMMU 424 acquires the data from memory 404 (or mass storage 406, should the data not be present in memory 404) and forwards the data to the requesting IO device. In some embodiments, IOMMU 424 includes page tables, translation lookaside buffers, and/or other functional blocks that are used for translating "virtual," or local, memory addresses used by IO devices 408-412 into physical addresses in memory 404 where data is actually located.

In the described embodiments, IOMMU 424 communicates with guest operating systems executed by cores 418-420 in virtual machines and vice versa. For example, in some embodiments, IOMMU 424 (or IO devices 408-412 via IOMMU 424) communicates events and peripheral page requests (PPRs) to guest operating systems. In these embodiments, IOMMU 424 reports, to guest operating systems, events such as IO page faults (for page table walks on behalf of IO devices 408-412), IOMMU 424 hardware errors, etc., via shared guest event logs in memory 404. In addition, in these embodiments, IOMMU 424 forwards, to guest operating systems, PPRs from peripherals (IO devices) that use the well-known address translation service or ATS standard for memory page servicing operations (i.e., for performing operations on or associated with pages in memory 404 that are accessible by the guest operating system) via shared guest PPR logs in memory 404. As another example, in some embodiments, guest operating systems communicate commands to IOMMU 424. In these embodiments, guest operating systems issue commands to the IOMMU 424 to control the IOMMU 424 and/or IO devices 408-412 such as completion wait (which serves as a command barrier that forces earlier commands to complete before the IOMMU 424 proceeds), device table entry invalidations, IOMMU 424 translation lookaside buffer entry invalidations, etc. via shared guest command buffers in memory 404.

In some embodiments, IOMMU 424 provides an interface to guest operating systems, the interface including memory-mapped locations, registers, etc. that are used for communicating with IOMMU 424. For example, in some embodiments, IOMMU 424 provides a set of memory mapped input-output (MMIO) memory locations to which guest operating systems can write values so that the values will be received by IOMMU 424. In some embodiments, the interface is virtualized, in that the memory locations, registers, etc. are not, as assumed by the guest operating system, used for storing the values, but instead are simply presented as such by IOMMU 424. In these embodiments, IOMMU 424 may receive values via the interface from guest operating systems (e.g., addressed to IOMMU MMIO addresses, etc.), but uses IOMMU backing store 426 and/or other locations in memory 404 for storing separate copies of the values in the memory locations, registers, etc. for each guest operating system. The memory accessed by IOMMU 424 for communicating with guest operating systems and other entities (e.g., processor 402, etc.) is described in more detail below.

In some embodiments, although not shown in FIG. 4, IOMMU 424 includes a local cache memory that is used for storing copies of data or information for IOMMU 424. For example, in some embodiments, the cache memory is used for storing copies of recently-used or often-used data from IOMMU backing store 426, such as sets of values for IOMMU MMIO registers for a given guest operating system and/or individual values therefrom. The cache memory is smaller than IOMMU backing store 426 and thus may only have capacity (i.e., memory locations) for storing a fraction (and likely a small fraction) of the data and information stored in IOMMU backing store 426.

Guest memory 428 is a portion of memory 404 (e.g., one or more contiguous or non-contiguous pages or blocks of memory) that is used by a corresponding guest operating system for storing data and information to be used by the guest operating system. Generally, guest memory 428 can be used by the guest operating system and/or other entities to store any form of data and information used by the guest operating system and/or other entities. In some embodiments, guest memory 428 is protected and only certain entities are permitted to access guest memory 428. For example, the corresponding guest operating system, the hypervisor, a security processor, and/or an operating system in electronic device 400 may "protect" guest memory 428 by limiting accesses of guest memory 428 to the corresponding guest operating system and specified other devices and/or functional blocks. In some embodiments, guest memory 428 is encrypted or otherwise rendered inaccessible by undesired entities. In some embodiments, guest memory 428 is used for storing guest event logs, guest peripheral page request (PPR) logs, and guest command buffers, which are data structures (e.g., tables, lists, etc.) that are used for communicating between the guest operating system and the IOMMU. Guest event logs, guest peripheral page request (PPR) logs, and guest command buffers are described in more detail below.

In some embodiments, communication paths are coupled between the various functional blocks in electronic device 400 (processor 402, memory controller 416, memory 404, etc.), as shown by arrow-headed lines between the elements. Communication paths include one or more buses, wires, guides, and/or other connections possibly along with controllers, fabric elements (switches, routers, etc.), circuit elements, etc. The communication paths are used to route commands, data, control signals, and/or other information between the functional blocks. For example, in some embodiments, a coherent bus fabric or interconnect is coupled between IO hub 414, processor 402 (e.g., MMU 422), and memory 404. Note that some communication paths in electronic device 400 are not shown in FIG. 4 for clarity.

In some embodiments, electronic device hardware 310 in FIG. 3 includes functional blocks and devices such as processor 402 and memory 404, and IO device hardware 314 includes functional blocks and devices such as IO devices 408-412. In these embodiments, IOMMU 312 in FIG. 3 and IOMMU 424 in FIG. 4 perform at least some of the same operations.

Electronic device 400 is shown using a particular number and arrangement of elements (e.g., functional blocks and devices such as processor 402, memory 404, etc.) and communication paths. Electronic device 400, however, is simplified for illustrative purposes, in some embodiments, a different number or arrangement of elements and/or communication paths is present in electronic device 400. For example, electronic device 400 can include power subsystems, displays, etc. Generally, electronic device 400 includes sufficient elements and communication paths to perform the operations herein described.

Electronic device 400 can be, or can be included in, any electronic device that performs computational operations. For example, electronic device 400 can be, or can be included in, electronic devices such as desktop computers, laptop computers, wearable electronic devices, tablet computers, smart phones, servers, artificial intelligence apparatuses, virtual or augmented reality equipment, network appliances, toys, audio-visual equipment, home appliances, controllers, vehicles, etc., and/or combinations thereof.

Portions of Memory Accessed by the IOMMU

Figure 5:
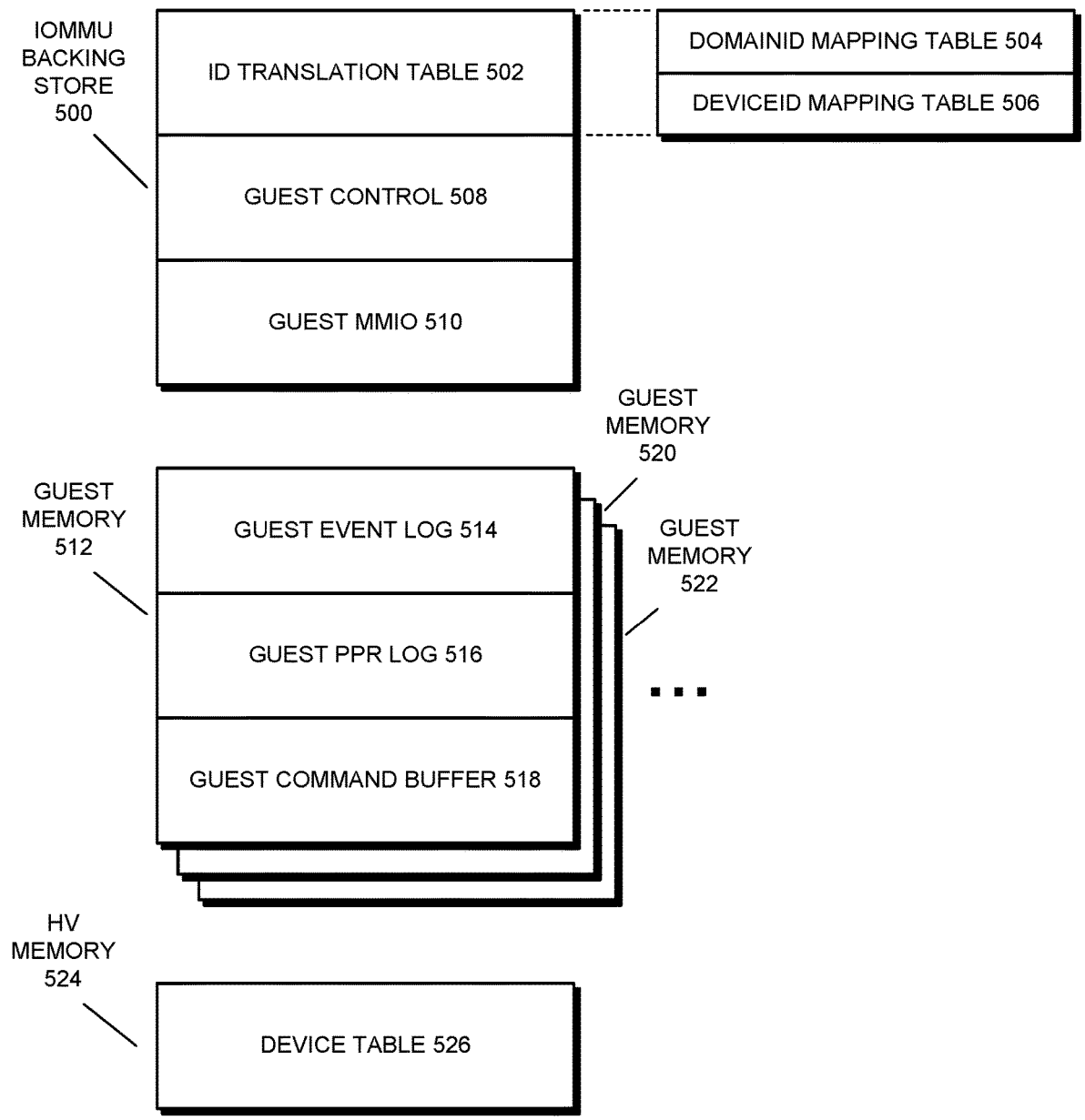
FIG. 5 presents a block diagram illustrating portions of memory accessed by an IOMMU in accordance with some embodiments.

In some embodiments, the IOMMU accesses data and information in different portions of memory (e.g., memory 404) in order to perform the operations herein described. In some of these embodiments, the portions of memory include an IOMMU backing store (e.g., IOMMU backing store 426), a guest memory (e.g., guest memory 428), and/or a hypervisor memory. FIG. 5 presents a block diagram illustrating portions of memory accessed by the IOMMU in accordance with some embodiments. Although FIG. 5 is presented as an example, in some embodiments, the memory and/or different portions of the memory store different types and/or arrangements of information. Generally, the memory includes sufficient information to enable the operations herein described.

As can be seen in FIG. 5, IOMMU backing store 500 includes ID translation table 502. Generally, ID translation table 502 includes information that is used by the IOMMU for translating or converting guest domainIDs and/or deviceIDs in communications from guest operating systems to the IOMMU to host domainID and/or deviceIDs—or the reverse, for communications from the IOMMU to the guest operating systems. DomainIDs and deviceIDs are described in more detail in the AMD I/O Virtualization Technology (IOMMU) Specification, rev. 3.00, December 2016, which, as described above, is incorporated by reference herein.

In some embodiments, ID translation table 502 includes separate tables for domainIDs, shown as domainID mapping table 504, and deviceIDs, shown as deviceID mapping table 506, although separate tables are not required (and thus all of the translations may be included in a single table). DomainID mapping table 504 includes a set of entries, each entry used for storing an identification or indication of a guest domainID that is associated with or related to a specified host domainID. DeviceID mapping table 506 includes a set of entries, each entry used for storing an identification or indication of a guest deviceID that is associated with or related to a specified host deviceID. In operation, when a guest or host domainID and/or deviceID is to be translated or converted in a communication, the IOMMU performs a lookup in ID translation table 502 (i.e., domainID mapping table 504 and/or deviceID mapping table 506) to acquire the corresponding translation or conversion.

IOMMU backing store 500 also includes guest control 508. Generally, guest control 508 includes copies of values stored in or from interface registers and control registers for guest operating systems in the electronic device. Guest control 508 includes, for each supported guest operating system, a copy of guest interface registers and/or guest operating system control registers (or at least the values therein) that control interactions between the IOMMU and that guest operating system. For example, guest control 508 may include, for each guest operating system, map control registers that are used for communicating domainID and/or deviceID mappings for the guest operating system to the IOMMU.

IOMMU backing store 500 further includes guest memory mapped input-output (MMIO) 510. Generally, guest MMIO 510 includes pointer and control information used for accessing buffers and logs (e.g., guest command buffers, guest event logs, and guest PPR logs) for guest operating systems in guest portions of memory 404 (e.g., guest memory 428). More specifically, guest MMIO 510 includes, for each supported guest operating system, a copy of values that are used for controlling accesses of buffers and logs in the guest portions of memory 404. For example, in some embodiments, the IOMMU supports (can interact with, process communications for, etc.) $2^N$ guest operating systems, where N=10, 16, or another value, and thus guest MMIO 510 includes up to $2^N$ copies of the values, one for each supported guest operating system. In the described embodiments, the values that are used for controlling accesses are similar to the values stored in IOMMU MMIO registers in existing devices, although a separate set of the values is kept for each supported guest operating system—and refers to that guest operating system's guest portion of memory 404 (and not the single copy in the IOMMU in existing devices).

Figure 6:
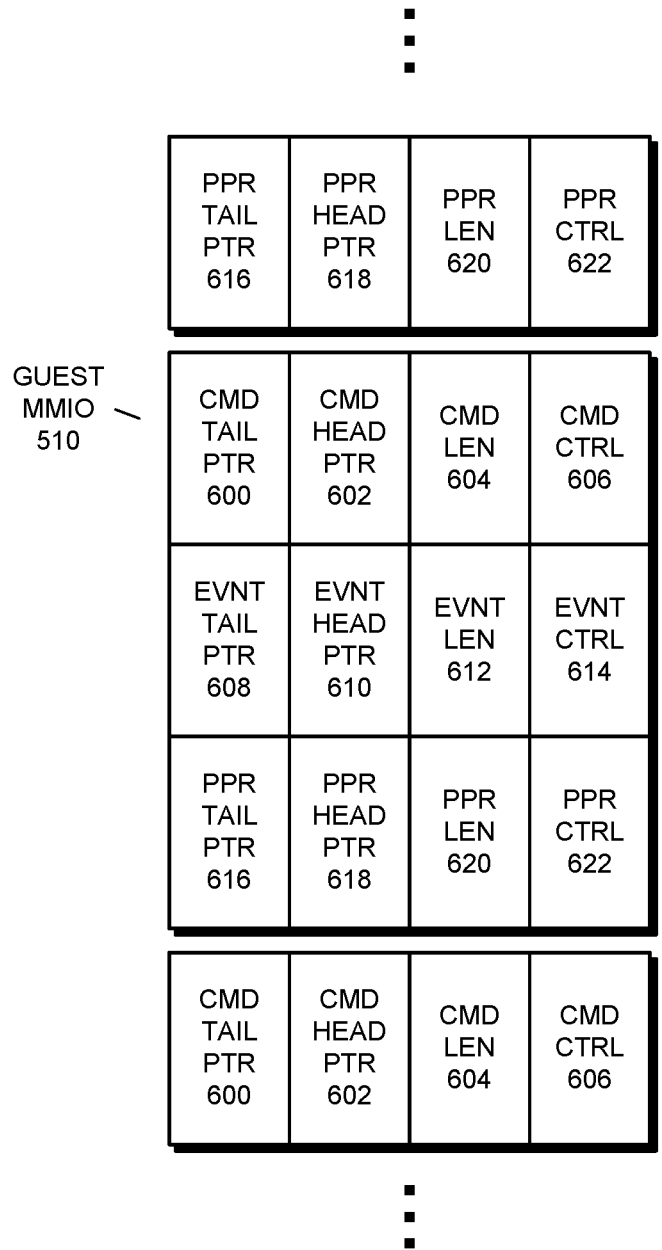
FIG. 6 presents a block diagram illustrating values stored in a guest copy of IOMMU MMIO registers in accordance with some embodiments.

FIG. 6 presents a block diagram illustrating values stored in guest MMIO 510 in accordance with some embodiments. For the example in FIG. 6, values are shown for a single complete set of IOMMU MMIO registers for a given guest operating system along with values for parts of two neighboring sets of IOMMU MMIO registers above and below the single complete set of values. FIG. 6 is shown in this way to illustrate that, as described above, in some embodiments, IOMMU backing store 426 includes multiple separate sets of values, each set of values associated with a given guest operating system. Although FIG. 6 is presented as an example, in some embodiments, guest MMIO 510 stores different or differently-arranged values. Generally, guest MMIO 510 and/or another entity stores sufficient information to access buffers and logs in guest portions of memory as herein described.

The values in each set of values in guest MMIO 510 can generally be grouped into values associated with a guest command (CMD) buffer, a guest event log, and a guest PPR log for a guest operating system. For the guest command buffer, the values include command tail pointer 600, which is a pointer or other reference that indicates a tail or most-recently written entry of the guest command buffer in the corresponding guest portion of memory 404. In other words, command tail pointer 600 holds a pointer or reference such as a memory address, e.g., some or all of the bits of a physical address in the guest portion of memory 404, that indicates where the tail or a most-recently written entry of the command buffer is located. The values for the guest command buffer also include command head pointer 602, which is a pointer or other reference that indicates a head or base of the command buffer, i.e., a location where the command buffer starts and/or the buffered commands start in the corresponding guest portion of memory 404. The values for the guest command buffer further include command length 604, which is a value that indicates the current size or maximum size of the command buffer, such as the number of entries or bytes. The values for guest command buffer further include command control 606, which is set or sequence of bits that includes a number of bits (or combinations thereof) that indicate the configuration of the guest operating system and/or the command buffer in the corresponding guest portion of memory 404. For example, in some embodiments, command control 606 includes bits that indicate whether certain command-buffer-related interrupts are enabled, whether command buffering or processing is enabled (or disabled/halted), what types of commands are or are allowed to be present in the command buffer, etc. For instance, in some embodiments, command control 606 includes control values for the command buffer similar to those described in the AMD I/O Virtualization Technology (IOMMU) Specification, rev. 3.00, which is, as described above, incorporated by reference herein—such as CmdWait-Int, CmdBufRun, CmdWaitInteEn, CmdBufEn, and/or other values.

In some embodiments, the command buffer is implemented as a ring buffer by using the command head pointer 602 to point at a next entry/location in the command buffer to be read and the command tail pointer 600 to indicate a last/most recently added entry/location in the command buffer (which can be the same entry/location, when only one command is stored in the command buffer). In these embodiments, as command is read from an entry and processed, command head pointer 602 is advanced by one entry until command head pointer 602 and command tail pointer 600 indicate the same entry. In some of these embodiments, command length 604 stores a maximum length of the command buffer. Using pointers to implement ring buffers is generally known in the art and therefore will not be described in detail herein.

For the event log, the values in guest MMIO 510, i.e., event tail pointer 608, event head pointer 610, event length 612, and event control 614 are similar in function to those described above for the command buffer, although the values are used for accesses to the event log in the corresponding guest portion of memory 404. The same is true for the PPR log, in that the values in guest MMIO 510, i.e., PPR tail pointer 616, PPR head pointer 618, PPR length 620, and PPR control 622, similar in function to those described above for the command buffer, although the values are used for accesses to the PPR log in the corresponding guest portion of memory 404.

In some embodiments, fewer than the supported number of guest operating systems (and possibly far fewer) may be executing in electronic device 400 at any given time. In some of these embodiments, IOMMU backing store 500 is dynamically adjusted to include sufficient space for storing guest MMIO 510, etc. In other words, as guest operating systems are initialized/active, the hypervisor and/or another entity can allocate, append, or activate space in IOMMU backing store 500 (i.e., in guest MMIO 510) for storing the IOMMU MMIO register values for the guest operating system. In some of these embodiments, IOMMU backing store 500 does not have additional empty/unused space allocated for virtual machines that do not yet exist (i.e., have not been initialized) in electronic device 400.

In some embodiments, the hypervisor performs at least some initialization operations for IOMMU backing store 500. For example, in some embodiments, the hypervisor allocates memory, e.g., contiguous or scattered pages of memory, in memory 404 for storing the IOMMU backing store. As described above, memory 404 is a general-purpose memory in electronic device 400 that is used by various functional blocks (e.g., cores 418-420, etc.) for storing data and information—and is not simply a local memory in the IOMMU. This operation therefore involves the hypervisor allocating space in the "main" memory of electronic device 400 for storing the IOMMU backing store. As another example, in some embodiments, the hypervisor, via the IOMMU, writes initial values into the copies of the IOMMU MMIO registers in the backing store for each active guest operating system. The hypervisor therefore writes the initial values of the pointers and the control values for each active guest operating system in the respective copy of the IOMMU MMIO registers in the IOMMU backing store, such as when the guest operating system starts up.

In some embodiments, only a subset of available IOMMU MMIO registers are included in the copies of the IOMMU MMIO registers in the IOMMU backing store. In these embodiments, other registers may be provided by the IOMMU itself. For example, in some embodiments, registers in the IOMMU that store IOMMU control values (e.g., IOMMU enable/disable, etc.), page table base addresses, etc. are provided by the IOMMU. Generally, IOMMU MMIO registers that are not used for accessing the buffers and logs in portions of the memory for guest operating systems are not presented as copies, but instead a single copy of each register is provided by the IOMMU. In some of these embodiments, the hypervisor emulates these IOMMU registers for guest operating systems, but accesses are received by and handled in the IOMMU for registers in the IOMMU.

Returning to FIG. 5, guest memory 512 includes guest event log 514, guest peripheral page request (PPR) log 516, and guest command buffer 518 for a guest operating system. Generally, guest event log 514, guest PPR log 516, and guest command buffer 518 are memory structures (e.g., lists, tables, buffers, etc.) that are used for storing corresponding events, PPR requests, and commands for access by the IOMMU and/or the guest operating system. For example, guest event log 514 may be a table or a ring buffer that includes a number of entries (e.g., 24, 50, etc.) each entry for holding information (e.g., a pattern of bits) representing a particular event that occurred in the IOMMU that is to be processed by the corresponding guest operating system. In operation, the IOMMU communicates, to the guest operating system, events and PPRs via the corresponding log in guest event logs 514 and guest PPR logs 516 in guest memory 512. In addition, the guest operating system communicates, to the IOMMU, commands via the corresponding command buffer in guest command buffers 518 in guest memory 512.

In some embodiments, each guest operating system active in electronic device 400 is associated with a corresponding separate guest portion of the memory (i.e., a number of pages in memory 404) that includes a guest event log, a peripheral page request log, and a guest command buffer used by that guest operating system and accessible by the IOMMU. This is shown in FIG. 5 as additional guest memories 520-522 behind guest memory 512.

Hypervisor memory 524 includes device table 526. Generally, device table 526 is a table in which device-related information is stored for devices (which can be actual/physical devices or virtual devices) in, associated with, and/or coupled to the electronic device. Device table 526 includes a set of entries, each entry useable to store information about a corresponding device, such as pointers to page tables and interrupt tables, control and configuration values, capability indicators, mode indicators, domainID, security information and settings, etc. In addition, in the described embodiments—and differently than in existing device tables—each entry in device table 526 includes deviceID and a guest identifier for a guest operating system in communication with, responsible for, or otherwise associated with the device. In operation, in addition to using the device table for determining information about devices, the IOMMU uses the deviceIDs and/or guest identifiers for translating or converting guest deviceIDs to host deviceIDs.

In some embodiments, some or all of the IOMMU backing store 500, guest memory 512, and hypervisor memory 524 and/or portions thereof are not contiguous, but instead are stored in different areas or locations of memory. For example, a base address of the guest event log 514 (and thus the guest event log itself) may be located remote in memory from the guest PPR log 516. Guest event log 514 may not, therefore, neighbor guest PPR log 516 as shown in FIG. 5.

In some embodiments, the IOMMU includes a private address map that includes pointers to, references, and/or other indications of the locations in memory of the various data and information in the memory to be accessed by the IOMMU. For example, in some embodiments, the IOMMU private address map includes pointers or references to individual copies of IOMMU MMIO registers for guest operating systems and/or starting points/base addresses for sets of copies of IOMMU MMIO registers in IOMMU backing store 500. In these embodiments, before accessing data and information in memory, the IOMMU performs a lookup in the private address map for the location of the data and information.

In some embodiments, IOMMU backing store 500 and/or portions thereof (control bits, etc.) are accessed by other entities in electronic device 400 via the IOMMU (e.g., by sending a request to the IOMMU) or are inaccessible by other entities. For example, at least some of the data and information in IOMMU backing store 500 may be accessed by other entities via writes to and reads from corresponding IOMMU MMIO registers.

IOMMU and Guest Operating System Communications

Figure 7:
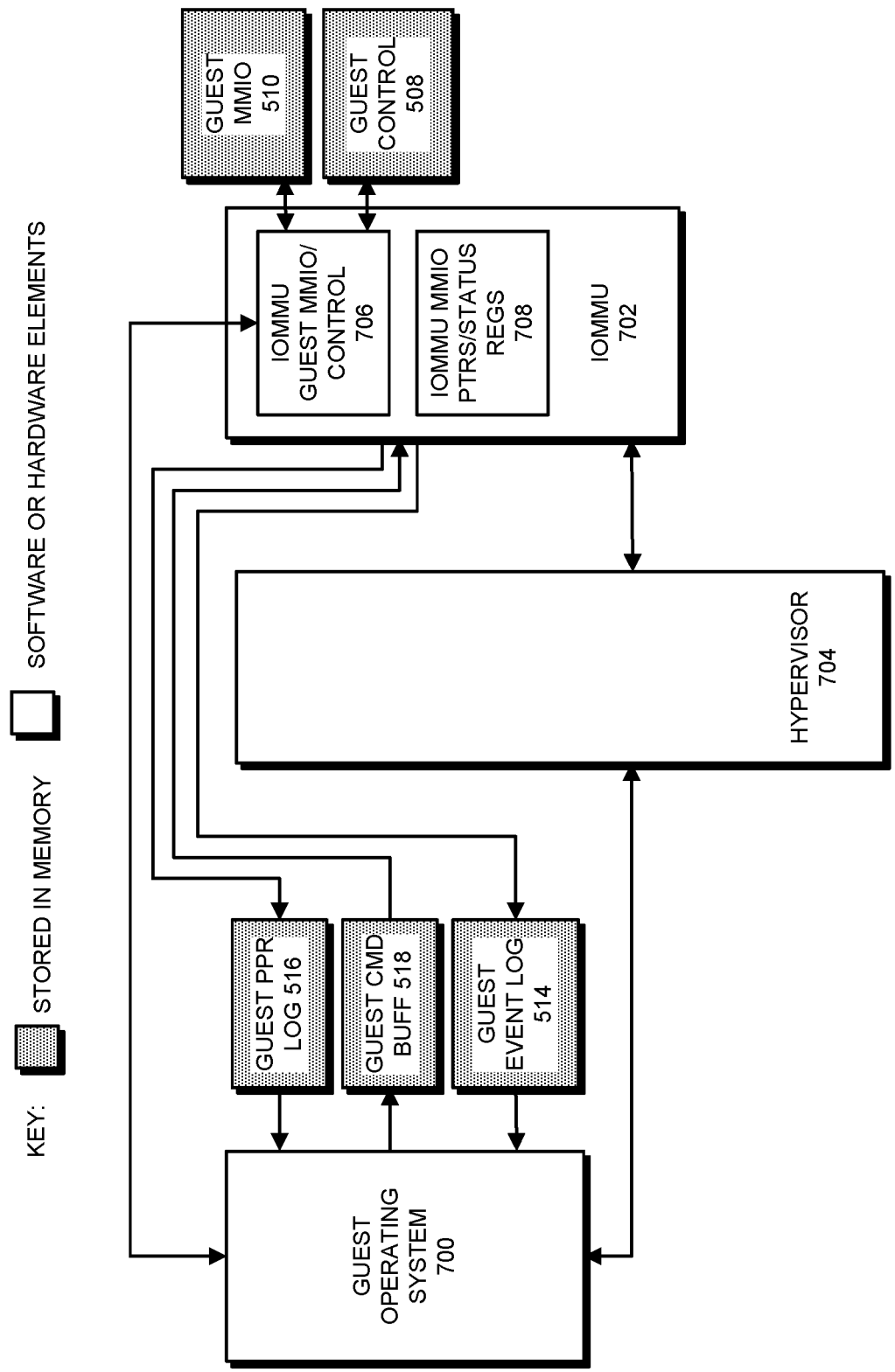
FIG. 7 presents a block diagram illustrating communications between a guest operating system and an IOMMU that are handled by the IOMMU in accordance with some embodiments.

In the described embodiments, an IOMMU (e.g., IOMMU 424) handles communications between the IOMMU (or IO devices serviced thereby) and guest operating systems. FIG. 7 presents a block diagram illustrating communications between a guest operating system 700 and an IOMMU 702 that are handled by IOMMU 702 in accordance with some embodiments. Although a number of elements are shown in a particular arrangement in FIG. 7, other embodiments use different numbers or arrangements of elements. Generally, in the described embodiments, IOMMU 702 includes or accesses sufficient elements to enable the operations herein described. In FIG. 7, a number of elements are shown dotted/stippled; these elements are logs, buffers, etc. that are stored in a memory (e.g., in IOMMU backing store 500, in guest memory 512, etc.) and accessed by IOMMU 702, guest operating system 700, and/or other entities using typical memory access techniques. In some embodiments, guest operating system 700, IOMMU 702, and hypervisor 704 are organized similarly to guest operating system 302, IOMMU 312, and hypervisor 306 in FIG. 3, although this is not a requirement.

Figure 2:
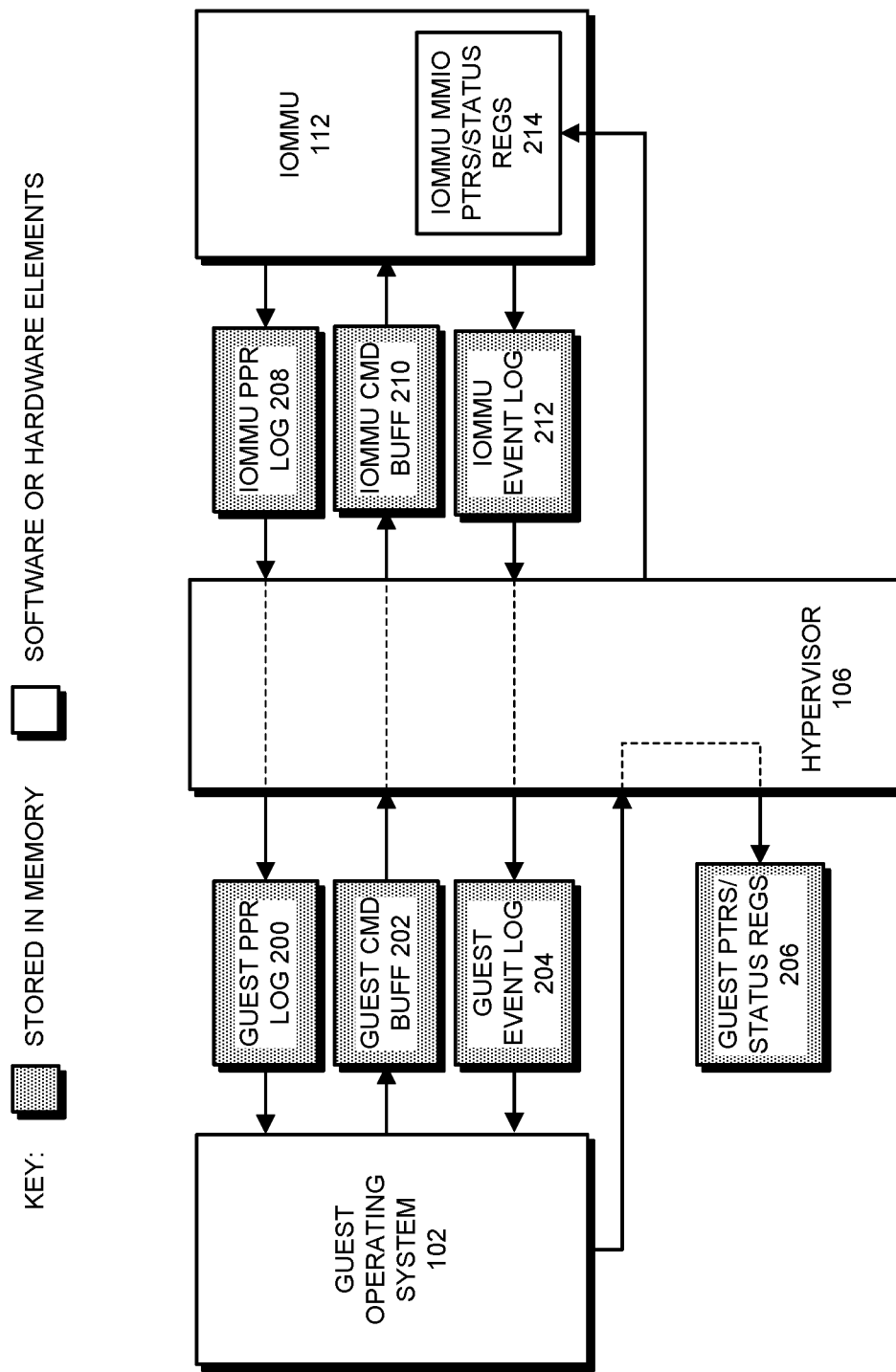
FIG. 2 presents a block diagram illustrating communications between a guest operating system and an IOMMU that are handled by the hypervisor.

As can be seen in FIG. 7, and differently than what is shown in FIG. 2 for existing systems, in the described embodiments, IOMMU 702 and guest operating system 700 communicate more directly with one another. In other words, IOMMU 702 and guest operating system 700 communicate with one another via guest event log 514, guest PPR log 516, and guest command buffer (BUFF) 518 in memory—i.e., in a guest portion of memory (e.g., guest memory 428) for guest operating system 700. In addition, guest operating system 700 and IOMMU 702 use guest control 508 and guest MMIO 510 to dictate how communications are to be performed. For example, in some embodiments, IOMMU 702 uses pointers in guest MMIO 510 to determine the locations in memory of guest event log 514, guest command buffer 518, and guest PPR log 516 for guest operating system 700. Hypervisor 704 does not intervene and is otherwise not involved in some or all of the operations for completing these communications. For example, hypervisor 704 does not perform operations such as translating domainIDs and deviceIDs for these communications, accessing the pointers in guest MMIO 510, and/or accessing the buffers and logs in the guest portion of the memory. Instead, IOMMU 702 performs these operations. Because IOMMU 702 translates the domainIDs and deviceIDs, accesses guest buffers and logs, etc., the described embodiments avoid using hypervisor 704 for processing at least part of communications between guest operating system 700 and IOMMU 702, which can mean that the communications complete more quickly, result in less load on processor 402 and memory 404, etc.

In operation, using a command as an example, guest operating system 700 writes an invalidate IOMMUpages command to guest command buffer 518. The command, when processed by IOMMU 702, causes IOMMU 702 to invalidate a range of entries in an IOMMU translation cache as specified by a domainID in the command. In other words, the guest operating system performs a memory write in a corresponding guest portion of the memory to update the next open/available entry in guest command buffer 518 to include information (i.e., bits representing the command) for the invalidate IOMMUpages command. Guest operating system 700 then sends a write command to the IOMMU to update (e.g., advance, etc.) a command buffer tail pointer (e.g., command tail pointer 600) in the corresponding IOMMU MMIO register to indicate that guest operating system 700 wrote the command to the command buffer. IOMMU 702 detects guest operating system 700's write of the command buffer tail pointer, e.g., via snooping the write to an address in the corresponding guest command buffer, detecting a change in the value of a buffer tail pointer, receiving the write command from guest operating system 700, etc. Upon detecting the write of the command buffer tail pointer, IOMMU 702 uses the value of the command buffer head pointer (e.g., command head pointer 602) to retrieve the command from the command buffer in the guest portion of the memory and prepares the command for processing (e.g., replacing a host domainID that is associated with a guest domainID in the command, etc.). IOMMU 702 then processes the command, causing IOMMU 702 to invalidate the range of entries in IOMMU 702's translation cache indicated by the host domainID. IOMMU 702 performs at least some similar operations for IOMMU 702 writes to guest PPR logs 516 and to guest event logs 514, albeit in reverse, as IOMMU 702 typically writes these logs and guest operating system 700 reads the logs.

Although hypervisor 704 is not involved in certain parts of communications between guest operating system 700 and IOMMU 702, e.g., the translation of the guest domainID to the host domainID, hypervisor 704 and guest operating system 700 and/or IOMMU 702 may separately exchange communications associated with communications between guest operating system 700 and IOMMU 702 or hypervisor 704 may otherwise be involved in ensuring that the communications are properly handled by guest operating system 700 and/or IOMMU 702. For example, hypervisor 704 may directly (e.g., via a communication) or indirectly (e.g., via snooping memory accesses) determine that IOMMU 702 or guest operating system 700 has performed a specified operation (e.g., writing to a buffer or log) and may perform operations such as signaling an interrupt to guest operating system 700 and/or IOMMU 702, updating a shared memory location that functions as a flag, etc. As described above, hypervisor 704 may also initialize the IOMMU backing store, etc.

Figure 8:
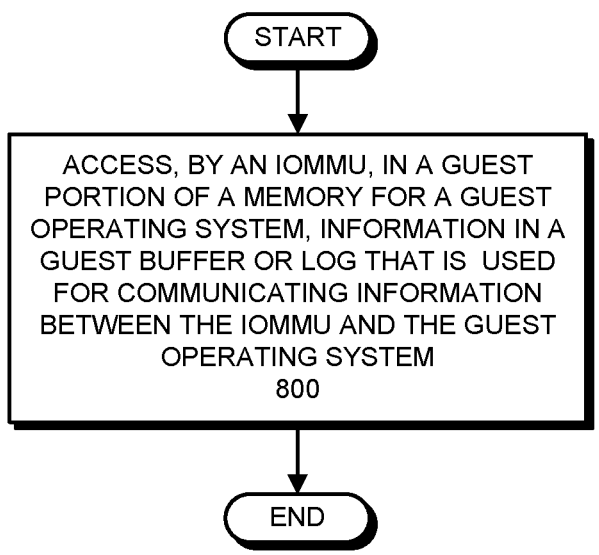
FIG. 8 presents a flowchart illustrating a process during which an IOMMU accesses memory locations in a guest portion of a memory for a guest operating system in accordance with some embodiments.

Processes for IOMMU Accesses of Guest Buffers and Logs in Guest Portions of Memory In the described embodiments, an IOMMU (e.g., IOMMU 702) performs operations for accessing (e.g., reading and writing) guest buffers and logs in guest portions of memory that are used for communicating information between the IOMMU and guest operating systems (e.g., guest operating system 700). For example, in some embodiments, the IOMMU accesses entries in guest command buffers, guest event logs, and/or guest peripheral page request (PPR) logs, in respective guest portions of the memory for guest operating systems. The IOMMU accesses the guest buffers and logs for each guest operating system directly, in that the IOMMU accesses the guest buffers and logs in each guest operating system's portion of the memory using typical memory access operations without a hypervisor processing the memory access operations. FIG. 8 presents a flowchart illustrating a process during which an IOMMU accesses a buffer or log in a guest portion of the memory for a guest operating system in accordance with some embodiments. Note that the operations shown in FIG. 8 are presented as a general example of operations performed by some embodiments. The operations performed by other embodiments include different operations, operations that are performed in a different order, and/or operations that are performed by different entities or functional blocks.

The operations shown in FIG. 8 are general in scope. More specific examples are presented in FIGS. 9-10, including the IOMMU reading from a buffer or log in a guest portion of a memory for a guest operating system FIG. 9 and the IOMMU writing to a buffer or log in a guest portion of a memory for a guest operating system FIG. 10.

As can be seen in FIG. 8, an IOMMU performs an access of information in a guest buffer or log in a guest portion of a memory for a guest operating system, the guest buffer or log used for communicating information between the IOMMU and the guest operating system (step 800). For this operation, the IOMMU first determines that the access is to be performed. For example, the IOMMU can determine that information is to be read from a particular guest buffer or log after receiving an indication that the information was written to the guest buffer or log by the guest operating system or another entity. The IOMMU then determines an address for the guest buffer or log (i.e., a particular memory location of an entry to be accessed) in the guest portion of the memory. The IOMMU next performs the access of the buffer or log in the guest portion of the memory. For accessing the buffer or log, the IOMMU performs a typical memory access operation using the address for the buffer or log. By accessing the buffer or log in the guest portion of the memory directly, instead of using its own set of buffers and logs (e.g., IOMMU buffers and logs such as IOMMU PPR log 208, etc.), the IOMMU enables communication with the guest operating system without hypervisor involvement.

Figure 9:
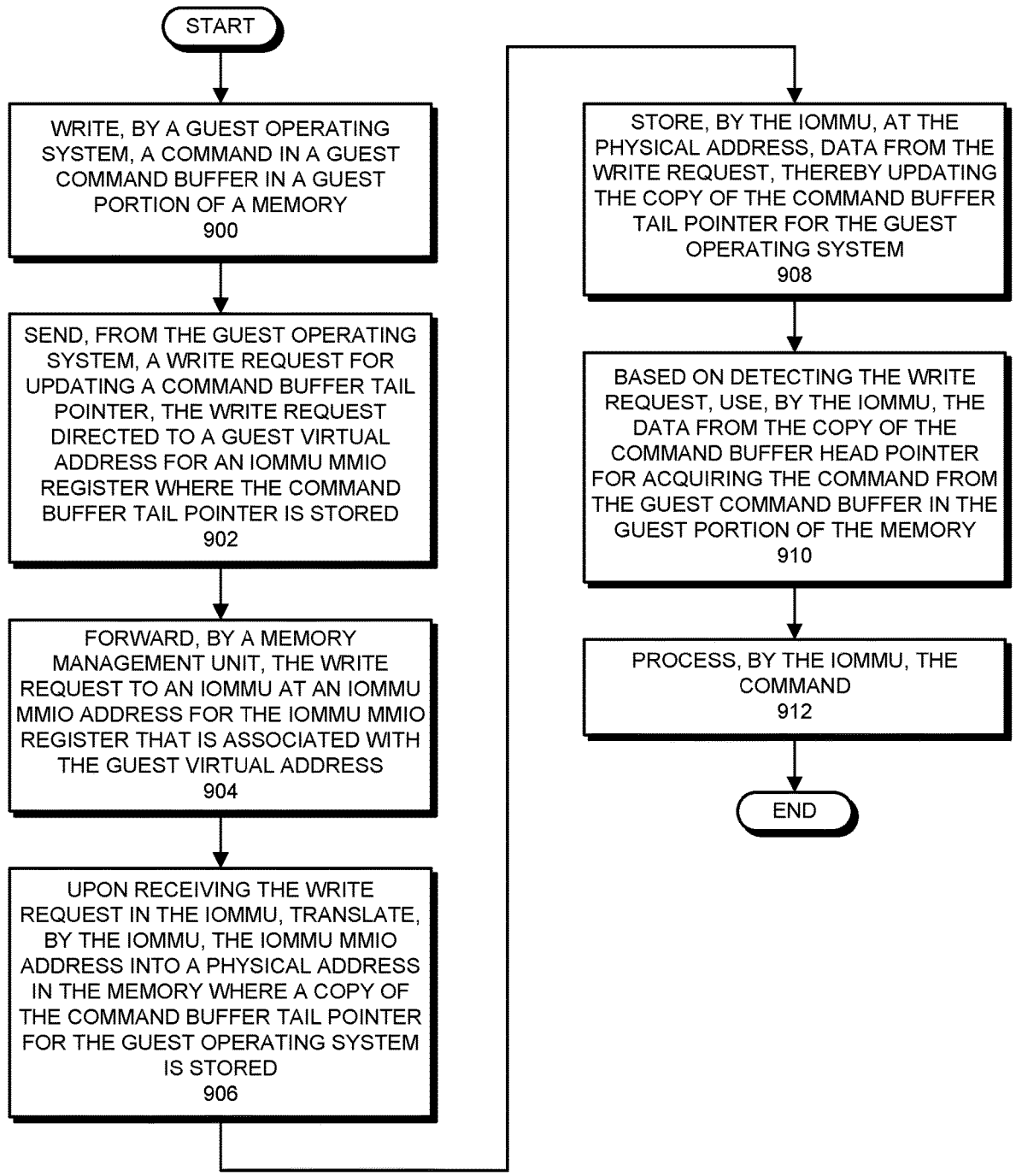
FIG. 9 presents a flowchart illustrating a process during which an IOMMU reads from a guest buffer or log in a guest portion of a memory in accordance with some embodiments.

FIG. 9 presents a flowchart illustrating a process during which a guest operating system writes to, and an IOMMU reads from, a guest buffer or log in a guest portion of a memory in accordance with some embodiments. Note that the operations shown in FIG. 9 are presented as a general example of operations performed by some embodiments. The operations performed by other embodiments include different operations, operations that are performed in a different order, and/or operations that are performed by different entities or functional blocks. For example, FIG. 9 uses a command in a guest command buffer as an example, but, in other embodiments, the IOMMU reads from a different buffer or log, such as a guest PPR log or a guest event log. In these embodiments, the IOMMU can perform some or all of the same operations for reading the different guest buffers or logs.

The operations in FIG. 9 start when a guest operating system (e.g., guest operating system 700) writes a command to a command buffer (e.g., guest command buffer 518) in a guest portion of a memory (e.g., guest memory 428) (step 900). For example, in some embodiments, the guest command buffer is a circular buffer in the guest portion of memory that includes a number of entries and this operation involves the guest operating system writing the command (i.e., a sequence of bits representing the command) to a next available entry in the guest command buffer.

Because the guest operating system has added a command to the guest command buffer that requires processing by an IOMMU (e.g., IOMMU 702), the guest operating system informs the IOMMU of the command. More specifically, the guest operating system sends a write request for updating a command buffer tail pointer, the write request directed to a guest virtual address for an IOMMU MMIO register where the command buffer tail pointer is stored (step 902). In the described embodiments, guest operating systems use local, or "virtual," addresses for accessing IOMMU MMIO registers (and may not be aware of actual IOMMU addresses). The guest virtual addresses are translated by a memory management unit (MMU) in the processor that executes the guest operating systems into system physical addresses (i.e., IOMMU MMIO addresses) in the IOMMU where the MMIO registers are located (e.g., by performing page table walks in page tables for the guest operating system, etc.). As described above, the IOMMU virtualizes the IOMMU MMIO registers, so the system physical address used by the MMU is not the address where the copy of the IOMMU MMIO register for the guest operating system is located, but instead is an address in the interface/aperture for the IOMMU that is recognized by the IOMMU as an access of the MMIO register. Thus, following the translation in the MMU, the MMU forwards the write request to the IOMMU at the IOMMU MMIO address (i.e., the system physical address) that is associated with the guest virtual address (step 904).

Because the IOMMU MMIO address is simply an address provided by the IOMMU for receiving access requests from the guest operating system, the IOMMU also performs a translation to determine, based on the write request, the physical address in the memory where the copy of the command buffer tail pointer for the guest operating system is stored (step 906). During this operation, the IOMMU determines, using an identity of the guest operating system, which dictates which copy of the IOMMU MMIO registers is accessed in the IOMMU backing store, the physical address in the memory. For this process, the IOMMU first, based on an identifier for the guest operating system and the system physical address provided by the MMU, computes, using an algorithm, a table, etc. an IOMMU virtual address for the copy of the IOMMU MMIO register for the guest operating system. The IOMMU then translates, using one or more page tables, the IOMMU virtual address into a system physical address where the copy of the IOMMU MMIO register for the guest operating system is stored in the IOMMU backing store.

The IOMMU then stores, at the physical address in the memory, data from the write request, thereby updating the copy of the command buffer tail pointer for the guest operating system (step 908). In other words, the IOMMU stores the data such as one or more bits of an updated address for the command buffer tail pointer, an entry identifier, a running count, etc. in the memory location where the copy of the command buffer tail pointer associated with the guest operating system is stored in the IOMMU backing store. The updating causes the command buffer tail pointer to indicate, directly or indirectly, that a command was written to the guest command buffer—and thus is awaiting processing by the IOMMU. In some embodiments, the IOMMU, the guest operating system, and/or another entity also sets other pointers or indicators to indicate that a command is awaiting processing in the guest command buffer or that the guest operating system provided a command. For example, in some embodiments, the IOMMU includes a set of command-waiting bits, one for each supported guest operating system, and the command-waiting bit is set (or cleared) for the guest operating system to indicate that the command is awaiting processing in the guest command buffer.

The IOMMU, based on detecting the write request (or otherwise determining that a command is awaiting processing), uses the data from the copy of the command buffer head pointer for acquiring the command from the guest command buffer in the guest portion of the memory (step 910). For this operation, the IOMMU directly or indirectly uses the data from the copy of the command buffer head pointer, possibly along with other pointers or information from copies of other IOMMU MMIO registers for the guest operating system from the backing store (e.g., a guest command buffer base pointer, etc.), to determine a system physical address of an entry in the guest command buffer in which the command is stored. For this operation, the IOMMU may, along with determining the address, perform translations, etc. (e.g., using corresponding page tables) in order to determine the system physical address of the entry in the guest command buffer. The IOMMU then reads the command from the system physical address, which can involve an operating system, the hypervisor, a memory management unit, etc., permitting the memory read to occur—assuming that the IOMMU is permitted to access the particular address in the guest portion of the memory. At the conclusion of this operation, the IOMMU has the command (e.g., has the individual bits of the command) as acquired from the guest portion of the memory—and is thus prepared to execute the command.

The IOMMU then processes the command (step 912). For this operation, in some embodiments, command processing logic in the IOMMU processes the command, which causes the IOMMU to perform operations for the command. Although not shown in FIG. 9, after processing the command, the IOMMU updates system state to indicate the command was processed. For example, in some embodiments, the IOMMU updates the command buffer head pointer in the copy of the corresponding IOMMU MMIO register for the guest operating system in the IOMMU backing store—and may update other command buffer information for the guest operating system in the IOMMU backing store.

Figure 10:
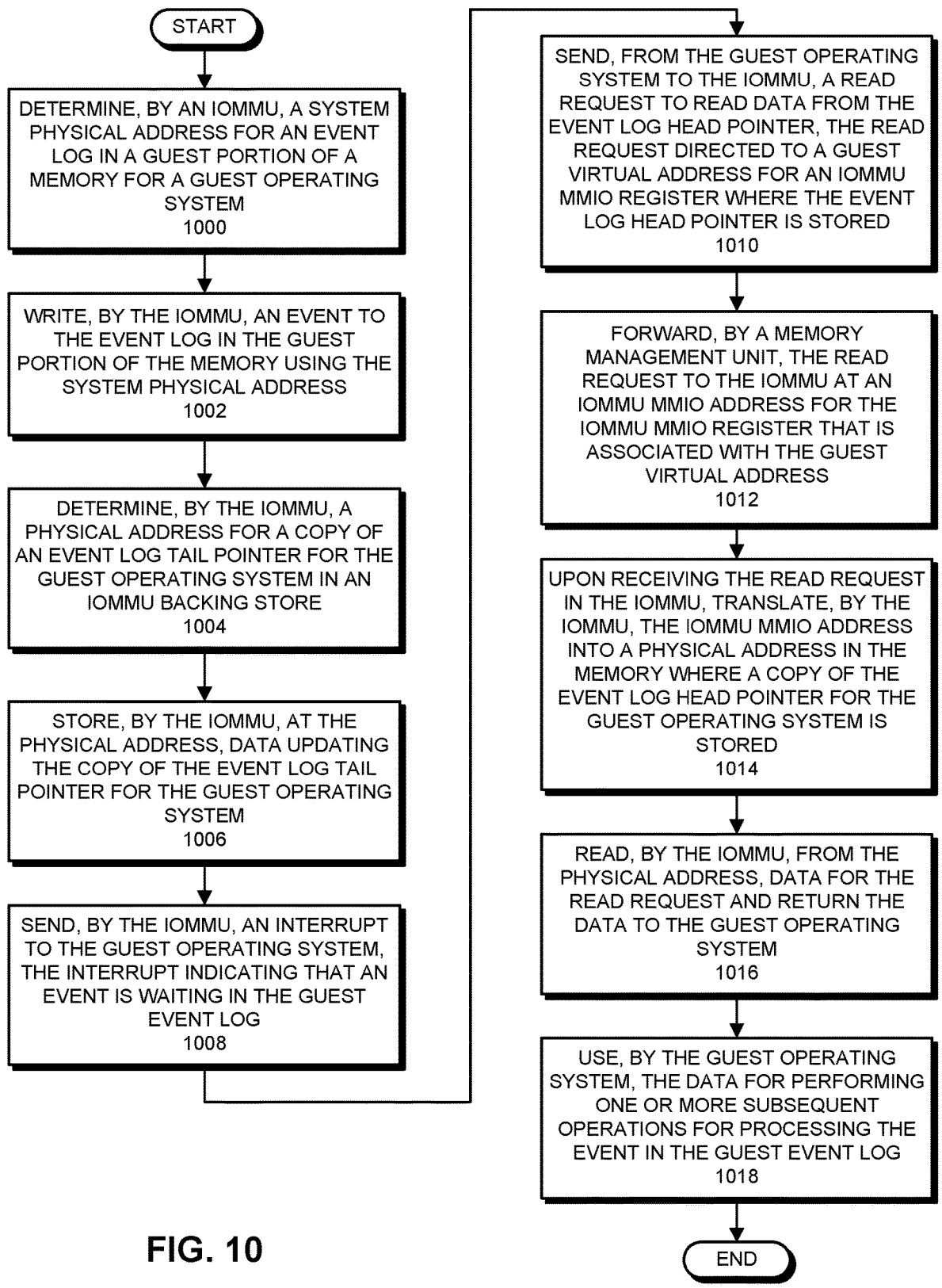
FIG. 10 presents a flowchart illustrating a process during which an IOMMU writes to a guest buffer or log in a guest portion of a memory in accordance with some embodiments.

FIG. 10 presents a flowchart illustrating a process during which an IOMMU writes to, and a guest operating system reads from, a guest buffer or log in a guest portion of a memory in accordance with some embodiments. Note that the operations shown in FIG. 10 are presented as a general example of operations performed by some embodiments. The operations performed by other embodiments include different operations, operations that are performed in a different order, and/or operations that are performed by different entities or functional blocks. For example, FIG. 10 uses an event in a guest event log as an example, but, in other embodiments, the IOMMU writes to a different buffer or log, such as a guest PPR log or a guest command buffer. In these embodiments, the IOMMU can perform some or all of the same operations for writing different guest buffers or logs.

The operations in FIG. 10 start when an IOMMU (e.g., IOMMU 702) determines a system physical address for a guest event log (e.g., guest event log 514) in a guest portion of a memory for a guest operating system (e.g., guest memory 428) (step 1000). For this operation, the IOMMU computes, looks up, or otherwise determines, based on an identifier for the guest operating system (e.g., a domainID), a system physical address of a copy of an IOMMU MMIO register for the guest operating system in an IOMMU backing store that holds a guest event log tail pointer. The system then acquires the guest event log tail pointer from the system physical address and directly or indirectly uses the value of the guest event log tail pointer (and possibly values from other copies of IOMMU MMIO registers for the guest operating system, such as an event log base pointer, etc.) as the system physical address for the guest event log. In some embodiments, the IOMMU performs one or more operations for computing the system physical address based on the value of the event log tail pointer and/or translating the value of the event log tail pointer using one or more page tables.

The IOMMU then uses the system physical address to write an event to a guest event log in the guest portion of a memory for a guest operating system (step 1002). For example, in some embodiments, the guest event log is a circular buffer in the guest portion of memory that includes a number of entries and this operation involves the IOMMU writing the event (i.e., a sequence of bits representing the event) to a next available entry in the guest event log. The IOMMU uses typical memory access operations to write the event to the guest event log. In some embodiments, writing to the system physical address in the guest portion of the memory involves an operating system, the hypervisor, a memory management unit, etc., permitting the memory write to occur—assuming that the IOMMU is permitted to access the particular address in the guest portion of the memory.

Because the IOMMU has added an event to the guest event log that requires processing by the guest operating system, the IOMMU informs the guest operating system of the event. In some embodiments, informing the guest operating system includes both updating a copy of the event log tail pointer for the guest operating system in the IOMMU backing store and sending an interrupt to the guest operating system to notify the guest operating system. The IOMMU therefore determines a physical address for a copy of an event log tail pointer for the guest operating system in an IOMMU backing store (step 1004). During this operation, the IOMMU determines, using an identity of the guest operating system, which dictates which copy of the IOMMU MMIO registers is accessed in the IOMMU backing store, and one or more IOMMU private address tables and/or page tables, the physical address in the memory. The IOMMU then stores, at the physical address, data updating the copy of the event log tail pointer for the guest operating system (step 1006). In other words, the IOMMU stores the data such as one or more bits of an updated address for the event log tail pointer, an entry identifier, a running count, etc. in the memory location where the copy of the event log tail pointer associated with the guest operating system is stored in the IOMMU backing store. The updating causes the event log tail pointer to indicate, directly or indirectly, that an event was written to the event log—and thus is awaiting processing by the guest operating system.

The IOMMU also sends an interrupt to the guest operating system, the interrupt indicating that an event is waiting in the guest event log (step 1008). For this operation, the IOMMU can use an internal interrupt mechanism by which interrupts are passed between the IOMMU and the appropriate guest operating system, by using, as an example a virtual advanced programmable interrupt controller (vAPIC) associated with the guest operating system.

In response to receiving the interrupt, the guest operating system sends, to the IOMMU, a read request to read data from the event log head pointer, the read request directed to a guest virtual address for an IOMMU MMIO register where the event log head pointer is stored (step 1010). In the described embodiments, guest operating systems use local, or "virtual," addresses for accessing IOMMU MMIO registers (and may not be aware of actual and/or virtual IOMMU addresses). The guest virtual addresses are translated by a memory management unit (MMU) in the processor that executes the guest operating systems into system physical addresses (i.e., IOMMU MMIO addresses) in the IOMMU where the MMIO registers are located (e.g., by performing page table walks in page tables for the guest operating system, etc.). As described above, the IOMMU virtualizes the IOMMU MMIO registers, so the system physical address used by the MMU is not the address where the copy of the IOMMU MMIO register for the guest operating system is located, but instead is an address in the interface/aperture for the IOMMU that is recognized by the IOMMU as an access of the MMIO register. Thus, following the translation in the MMU, the MMU forwards the read request to the IOMMU at the IOMMU MMIO address (i.e., the system physical address) that is associated with the guest virtual address (step 1012).

Because the IOMMU MMIO address is simply an address provided by the IOMMU for receiving access requests from the guest operating system, the IOMMU also performs a translation to determine, based on the read request, the physical address in the memory where the copy of the event log head pointer for the guest operating system is stored (step 1014). During this operation, the IOMMU determines, using an identity of the guest operating system, which dictates which copy of the IOMMU MMIO registers is accessed in the IOMMU backing store, the physical address in the memory. For this process, the IOMMU first, based on an identifier for the guest operating system and the system physical address provided by the MMU, computes, using an algorithm, a table, etc. an IOMMU virtual address for the copy of the IOMMU MMIO register for the guest operating system. The IOMMU then translates, using one or more page tables, the IOMMU virtual address into a system physical address where the copy of the IOMMU MMIO register for the guest operating system is stored in the IOMMU backing store.

The IOMMU then reads, from the memory location at the physical address in the memory, data for the read request. In other words, the IOMMU reads data such as one or more bits of an address for the event log head pointer, an entry identifier, a running count, etc. in the memory location where the copy of the event log head pointer associated with the guest operating system is stored in the IOMMU backing store. The event log head pointer indicates, directly or indirectly, a next event written to the guest event log that is awaiting processing by the guest operating system. In some embodiments, the IOMMU, the guest operating system, and/or another entity also sets other pointers or indicators to indicate that an event is awaiting processing in the guest event log or that the IOMMU provided an event. For example, in some embodiments, the guest operating system and/or hypervisor includes a set of event-waiting bits, one for each supported guest operating system, and the event-waiting bit is set (or cleared) for the guest operating system to indicate that the event is awaiting processing in the guest event log. The IOMMU then returns the data from the event log head pointer to the guest operating system (step 1016).

The guest operating system next uses the data for performing one or more subsequent operations for processing the event in the guest event log (step 1018). For example, in some embodiments, the copy of the event log head pointer for the guest operating system stores an address of a location in the guest portion of the memory where the entry for the event log is located and the guest operating system directly or indirectly uses the address to acquire the event from the guest event log before processing the event.

In some embodiments, an electronic device (e.g., electronic device 400 and/or some portion thereof) uses code and/or data stored on a non-transitory computer-readable storage medium to perform some or all of the operations herein described. More specifically, the electronic device reads the code and/or data from the computer-readable storage medium and executes the code and/or uses the data when performing the described operations. A computer-readable storage medium can be any device, medium, or combination thereof that stores code and/or data for use by an electronic device. For example, the computer-readable storage medium can include, but is not limited to, volatile and/or non-volatile memory, including flash memory, random access memory (e.g., eDRAM, RAM, SRAM, DRAM, DDR4 SDRAM, etc.), read-only memory (ROM), and/or magnetic or optical storage mediums (e.g., disk drives, magnetic tape, CDs, DVDs, etc.).

In some embodiments, one or more hardware modules perform the operations herein described. For example, the hardware modules can include, but are not limited to, one or more processors/cores/central processing units (CPUs), application-specific integrated circuit (ASIC) chips, neural network processors or accelerators, field-programmable gate arrays (FPGAs), compute units, embedded processors, graphics processors (GPUs)/graphics cores, pipelines, accelerated processing units (APUs), caches/cache controllers, memories/memory controllers, functional blocks, and/or other programmable-logic devices. When such hardware modules are activated, the hardware modules perform some or all of the operations. In some embodiments, the hardware modules include one or more general purpose circuits that are configured by executing instructions (program code, firmware, etc.) to perform the operations.

In some embodiments, a data structure representative of some or all of the structures and mechanisms described herein (e.g., electronic device 400, IOMMU 424, and/or some portion thereof) is stored on a non-transitory computer-readable storage medium that includes a database or other data structure which can be read by an electronic device and used, directly or indirectly, to fabricate hardware including the structures and mechanisms. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist including a list of gates/circuit elements from a synthesis library that represent the functionality of the hardware including the above-described structures and mechanisms. The netlist may then be placed and routed to produce a data set describing geometric shapes to be applied to masks. The masks may then be used in various semiconductor fabrication steps to produce a semiconductor circuit or circuits (e.g., integrated circuits) corresponding to the above-described structures and mechanisms. Alternatively, the database on the computer accessible storage medium may be the netlist (with or without the synthesis library) or the data set, as desired, or Graphic Data System (GDS) II data.

In this description, variables or unspecified values (i.e., general descriptions of values without particular instances of the values) are represented by letters such as N. As used herein, despite possibly using similar letters in different locations in this description, the variables and unspecified values in each case are not necessarily the same, i.e., there may be different variable amounts and values intended for some or all of the general variables and unspecified values. In other words, N and any other letters used to represent variables and unspecified values in this description are not necessarily related to one another.

The expression "et cetera" or "etc." as used herein is intended to present an and/or case, i.e., the equivalent of "at least one of" the elements in a list with which the etc. is associated. For example, in the statement "the electronic device performs a first operation, a second operation, etc.," the electronic device performs at least one of the first operation, the second operation, and other operations. In addition, the elements in a list associated with an etc. are merely examples from among a set of examples—and at least some of the examples may not appear in some embodiments.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. An electronic device, comprising:
   a processor that executes a guest operating system;
   a memory, the memory having a guest portion that is reserved for storing data and information to be accessed by the guest operating system, wherein each guest operating system on the electronic device is allocated a separate guest portion for storing data and information for that guest operating system; and
   an input-output memory management unit (IOMMU) configured to:
      write, in the guest portion, information into guest buffers and/or logs used for communicating information from the IOMMU to the guest operating system; and
      read, from the guest portion, information in guest buffers and/or logs used for communicating information from the guest operating system to the IOMMU, the IOMMU directly accessing the guest buffers and/or logs in the guest portion for performing the writing and reading.

2. The electronic device of claim 1, wherein writing, by the IOMMU, information into a given guest buffer or log in the guest portion comprises:
   determining, by the IOMMU, a system physical address of the given guest buffer or log in the memory;
   writing, by the IOMMU, information to the given guest buffer or log in the memory at the system physical address; and
   sending, by the IOMMU, to the guest operating system, an indication that the IOMMU wrote the information to the given guest buffer or log.

3. The electronic device of claim 2, wherein writing, by the IOMMU, information into the given guest buffer or log in the guest portion further comprises:
   determining, by the IOMMU, based on an identifier for the guest operating system, a system physical address of a copy of an IOMMU MMIO register for the guest operating system in an IOMMU backing store;
   acquiring, by the IOMMU, the system physical address from the copy of the IOMMU MMIO register for the guest operating system in the IOMMU backing store; and
   updating, by the IOMMU, after writing the information to the guest buffer or log, the copy of the IOMMU MMIO register for the guest operating system in the IOMMU backing store to indicate the write to the guest buffer or log.

4. The electronic device of claim 2, wherein sending the indication to the guest operating system comprises:
   sending, by the IOMMU, an internal interrupt to the guest operating system via a virtual copy of an interrupt controller for the guest operating system, the internal interrupt informing the guest operating system that the IOMMU wrote the given guest buffer or log.

5. The electronic device of claim 3, wherein the guest operating system reads, based on the indication, the information from the guest buffer or log in the guest portion at the system physical address.

6. The electronic device of claim 5, wherein reading, by the guest operating system, the information from the guest buffer or log in the guest portion comprises:
   acquiring, by the guest operating system, via the IOMMU, information from the copy of the IOMMU MMIO register for the guest operating system in the IOMMU backing store; and
   using, by the guest operating system, the information from the copy of the IOMMU MMIO register for reading the information from the guest buffer or log in the guest portion.

7. The electronic device of claim 1, wherein reading, by the IOMMU, information from a given guest buffer or log in the guest portion comprises:
   receiving, by the IOMMU, from the guest operating system, a memory write request to update an IOMMU MMIO register that is associated with the given guest buffer or log, the guest operating system having separately written to the given guest buffer or log;
   determining, by the IOMMU, based on the update, a system physical address of the given guest buffer or log in the guest portion; and
   reading, by the IOMMU, information from the given guest buffer or log in the memory at the system physical address.

8. The electronic device of claim 7, wherein the IOMMU is further configured to:

determine, based on the memory write request and an identifier for the guest operating system, a system physical address for a copy of the IOMMU MMIO register for the guest operating system in an IOMMU backing store; and perform, a corresponding update of the copy of the IOMMU MMIO register for the guest operating system in the IOMMU backing store.

9. The electronic device of claim 1, wherein the guest buffers and/or logs include some or all of:
a command buffer;
an event log; and
a peripheral page request (PPR) log.

10. The electronic device of claim 1, wherein:
the processor executes at least one other guest operating system and the memory has a separate guest portion reserved for storing data and information to be accessed by the at least one other guest operating system; and
the IOMMU is configured to:
write, in a corresponding guest portion, information into guest buffers and/or logs used for communicating information from the IOMMU to the at least one other guest operating system; and
read, from the corresponding guest portion, information in guest buffers and/or logs used for communicating information from the at least one other guest operating system to the IOMMU.

11. The electronic device of claim 1, wherein the IOMMU is implemented in circuitry.

12. The electronic device of claim 1, wherein the data and information to be accessed by the guest operating system in the guest portion includes guest buffers and/or logs to be accessed by the guest operating system.

13. A method for accessing guest buffers and logs in an electronic device that comprises a processor that executes a guest operating system; a memory, the memory having a guest portion that is reserved for storing data and information to be accessed by the guest operating system, wherein each guest operating system on the electronic device is allocated a separate guest portion for storing data and information for that guest operating system; and an input-output memory management unit (IOMMU), the method comprising:
writing, by the IOMMU, in the guest portion, information into guest buffers and/or logs used for communicating information from the IOMMU to the guest operating system; and
reading, by the IOMMU, from the guest portion, information in guest buffers and/or logs used for communicating information from the guest operating system to the IOMMU, the IOMMU directly accessing the guest buffers and/or logs in the guest portion for performing the writing and reading.

14. The method of claim 13, wherein writing, by the IOMMU, information into a given guest buffer or log in the guest portion comprises:
determining, by the IOMMU, a system physical address of the given guest buffer or log in the memory;
writing, by the IOMMU, information to the given guest buffer or log in the memory at the system physical address; and
sending, by the IOMMU, to the guest operating system, an indication that the IOMMU wrote the information to the given guest buffer or log.

15. The method of claim 14, wherein writing, by the IOMMU, information into the given guest buffer or log in the guest portion further comprises:

determining, by the IOMMU, based on an identifier for the guest operating system, a system physical address of a copy of an IOMMU MMIO register for the guest operating system in an IOMMU backing store;
acquiring, by the IOMMU, the system physical address from the copy of the IOMMU MMIO register for the guest operating system in the IOMMU backing store; and
updating, by the IOMMU, after writing the information to the guest buffer or log, the copy of the IOMMU MMIO register for the guest operating system in the IOMMU backing store to indicate the write to the guest buffer or log.

16. The method of claim 14, wherein sending the indication to the guest operating system comprises:
sending, by the IOMMU, an internal interrupt to the guest operating system via a virtual copy of an interrupt controller for the guest operating system, the internal interrupt informing the guest operating system that the IOMMU wrote the given guest buffer or log.

17. The method of claim 15, further comprising:
reading, by the guest operating system, based on the indication, the information from the guest buffer or log in the guest portion at the system physical address.

18. The method of claim 17, wherein reading, by the guest operating system, the information from the guest buffer or log in the guest portion comprises:
acquiring, by the guest operating system, via the IOMMU, information from the copy of the IOMMU MMIO register for the guest operating system in the IOMMU backing store; and
using, by the guest operating system, the information from the copy of the IOMMU MMIO register for reading the information from the guest buffer or log in the guest portion.

19. The method of claim 13, wherein reading, by the IOMMU, information from a given guest buffer or log in the guest portion comprises:
receiving, by the IOMMU, from the guest operating system, a memory write request to update an IOMMU MMIO register that is associated with the given guest buffer or log, the guest operating system having separately written to the given guest buffer or log;
determining, by the IOMMU, based on the update, a system physical address of the given guest buffer or log in the guest portion; and
reading, by the IOMMU, information from the given guest buffer or log in the memory at the system physical address.

20. The method of claim 19, wherein the IOMMU is further configured to:
determine, based on the memory write request and an identifier for the guest operating system, a system physical address for a copy of the IOMMU MMIO register for the guest operating system in an IOMMU backing store; and
perform, a corresponding update of the copy of the IOMMU MMIO register for the guest operating system in the IOMMU backing store.

21. The method of claim 13, wherein the guest buffers and/or logs include some or all of:
a command buffer;
an event log; and
a peripheral page request (PPR) log.

22. The method of claim 13, wherein:
the processor executes at least one other guest operating system and the memory has a separate guest portion reserved for storing data and information to be accessed by the at least one other guest operating system; and the IOMMU is configured to:
- write, in a corresponding guest portion, information into guest buffers and/or logs used for communicating information from the IOMMU to the at least one other guest operating system; and
- read, from the corresponding guest portion, information in guest buffers and/or logs used for communicating information from the at least one other guest operating system to the IOMMU.

* * * * *